(12) United States Patent
Ohyama et al.

(10) Patent No.: US 10,220,677 B2
(45) Date of Patent: Mar. 5, 2019

(54) VEHICLE AIR CONDITIONER HAVING A GAS INJECTION CYCLE

(71) Applicant: DENSO CORPORATION, Kariya, Aichi-pref. (JP)

(72) Inventors: Teruaki Ohyama, Kariya (JP); Koji Sakai, Kariya (JP); Yuji Kamiya, Kariya (JP); Tomoyuki Sumi, Kariya (JP); Shinji Nakamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/549,431

(22) PCT Filed: Jan. 29, 2016

(86) PCT No.: PCT/JP2016/052650
§ 371 (c)(1),
(2) Date: Aug. 8, 2017

(87) PCT Pub. No.: WO2016/136382
PCT Pub. Date: Sep. 1, 2016

(65) Prior Publication Data
US 2018/0022184 A1    Jan. 25, 2018

(30) Foreign Application Priority Data
Feb. 24, 2015   (JP) .................................. 2015-034296

(51) Int. Cl.
*B60H 1/00*      (2006.01)
*B60L 1/00*      (2006.01)
(Continued)

(52) U.S. Cl.
CPC ..... *B60H 1/00892* (2013.01); *B60H 1/00385* (2013.01); *B60H 1/00921* (2013.01);
(Continued)

(58) Field of Classification Search
CPC ............ B60H 1/00892; B60H 1/00385; B60H 1/00921; B60H 2001/3272;
(Continued)

(56) References Cited

U.S. PATENT DOCUMENTS 4,344,297 A * 8/1982 Ueno ........................ F25B 1/04
236/80 R
5,704,219 A    1/1998 Suzuki et al.
(Continued)

FOREIGN PATENT DOCUMENTS

JP      S60078255 A    5/1985
JP      H09039550 A    2/1997
(Continued)

*Primary Examiner* — Jonathan Bradford
(74) *Attorney, Agent, or Firm* — Harness, Dickey & Pierce, P.L.C.

(57) ABSTRACT

An air conditioner for a vehicle has a compressor, a radiator, a first pressure reducer, a gas-liquid separator, a second pressure reducer, an exterior heat exchanger, an intermediate pressure refrigerant passage, a switching device, and a controller. The controller operates the switching device to switch from a refrigerant circuit of a two-stage compression mode to a refrigerant circuit of a single-stage compression mode when a compressor stop signal is output in the two-stage compression mode. The single-stage compression mode is a mode that blocks at least a flow of an intermediate-pressure refrigerant into the intermediate pressure refrigerant passage and makes refrigerant remained in the intermediate pressure refrigerant passage to flow out of the intermediate pressure refrigerant passage. The controller stops the compressor after controls the compressor to continue operating for a specified time in the single-stage compression mode. The controller restarts the compressor when the compressor stop signal is canceled.

13 Claims, 9 Drawing Sheets

(51) Int. Cl.
*B60L 1/08* (2006.01)
*F25B 49/02* (2006.01)
*B60H 1/32* (2006.01)
*F25B 1/04* (2006.01)
*F25B 5/04* (2006.01)
*F25B 6/04* (2006.01)

(52) U.S. Cl.
CPC ............ *B60H 1/3223* (2013.01); *B60L 1/003* (2013.01); *B60L 1/08* (2013.01); *F25B 49/02* (2013.01); *B60H 2001/3272* (2013.01); *B60H 2001/3275* (2013.01); *B60H 2001/3292* (2013.01); *F25B 1/04* (2013.01); *F25B 5/04* (2013.01); *F25B 6/04* (2013.01); *F25B 2341/0662* (2013.01); *F25B 2400/0409* (2013.01); *F25B 2400/0411* (2013.01); *F25B 2400/23* (2013.01); *F25B 2600/021* (2013.01); *F25B 2600/2501* (2013.01); *F25B 2600/2509* (2013.01)

(58) Field of Classification Search
CPC .... B60H 2001/3275; B60H 2001/3292; B60L 1/003; B60L 1/08; F25B 43/00; F25B 2400/23

See application file for complete search history.

(56) References Cited

U.S. PATENT DOCUMENTS

| | | | |
|---|---|---|---|
| 2013/0055751 A1* | 3/2013 | Inaba | B60H 1/2218 62/498 |
| 2013/0312447 A1 | 11/2013 | Inaba et al. | |
| 2014/0238067 A1 | 8/2014 | Itou et al. | |
| 2014/0290772 A1 | 10/2014 | Itou et al. | |

FOREIGN PATENT DOCUMENTS

| | | |
|---|---|---|
| JP | H10132401 A | 5/1998 |
| JP | H10259788 A | 9/1998 |
| JP | 2010117072 A | 5/2010 |
| JP | 2012181005 A | 9/2012 |
| JP | 2013092355 A | 5/2013 |

* cited by examiner

VEHICLE AIR CONDITIONER HAVING A GAS INJECTION CYCLE

CROSS REFERENCE TO RELATED APPLICATIONS

This application is a U.S. National Phase Application under 35 U.S.C. 371 of International Application No. PCT/JP2016/052650 filed on Jan. 29, 2016 and published in Japanese as WO 2016/136382 A1 on Sep. 1, 2016. This application is based on and claims the benefit of priority from Japanese Patent Application No. 2015-034296 filed on Feb. 24, 2015. The entire disclosures of the applications are incorporated herein by reference.

TECHNICAL FIELD

The present disclosure relates to an air conditioner for a vehicle having a gas injection cycle.

BACKGROUND ART

Patent Literature 1 discloses a refrigeration cycle for a vehicle having a gas injection cycle. The refrigeration cycle uses a compressor that compresses refrigerant using driving power generated by an engine.

However, electric vehicles such as battery vehicles and hybrid vehicles prevail in recent years, and thereby an electric compressor operated by an electric motor is used for a vehicle air conditioner mounted in a vehicle. For example, in a hybrid vehicle, the air conditioner can be operated even when an engine is stopped by using the electric compressor.

PRIOR ART LITERATURES

Patent Literature

Patent Literature 1: JP 2010-117072 A

SUMMARY OF INVENTION

Here, the following anomalies may occur when using an electric compressor operated by an electric motor in an air conditioner for a vehicle that is mounted in the electric vehicles and has the gas injection cycle.

First, the electric compressor configuring the gas injection cycle has a compression mechanism, an electric motor operating the compression mechanism, a suction port, a discharge port, and an intermediate port. The electric compressor draws a low-pressure refrigerant from the suction port and then compresses the low-pressure refrigerant to be a high-pressure refrigerant, and discharges the high-pressure refrigerant from the discharge port. The intermediate port draws an intermediate-pressure refrigerant from the refrigeration cycle, and the intermediate-pressure refrigerant joins the refrigerant being compressed in the electric compressor.

A refrigerant passage, which guides the intermediate-pressure refrigerant to be drawn from the refrigeration cycle into the intermediate port of the electric compressor and to join the refrigerant being compressed, configures the gas injection cycle (i.e., a two-stage compression cycle). The gas injection cycle is used as a technique that improves a heating performance of a heat pump cycle in a heating mode under super-cold environment. Accordingly, an operation mode (i.e., a two-stage compression mode) of the gas injection cycle is performed in the heating mode under the super-cold environment.

Second, an abnormality occurring when using the electric compressor will be described hereafter.

The vehicle has a power source that applies electric power to the electric compressor. Accordingly, an operation of the electric compressor may be stopped temporary in some cases when the power source is used to apply electric power to other vehicle devices such as a main mechanism.

However, when a heating operation is performed in a two-stage compression mode and the electric compressor is temporary stopped, refrigerant flows backward due to a pressure difference between an intermediate-pressure refrigerant and the suction refrigerant. When the refrigerant flows backward, the electric compressor is kept rotating backward for a long time. The electric compressor cannot be restarted while rotating backward and thereby it is necessary to wait for the electric compressor to stop rotating backward and then the electric compressor is restarted. If the electric compressor is restarted while rotating backward, the electric compressor fails to be restarted and thereby causing a waiting period such that the electric compressor is protected by not being restarted until a specified time elapses.

Accordingly, even when a stop signal for stopping an operation of the electric compressor is canceled, the electric compressor cannot be restarted until the electric compressor stops rotating backward or until the waiting period elapses. As a result, a temperature of air blown into a vehicle compartment becomes very low since an interior blower blows the air into a vehicle compartment while the compressor is stopped, and thereby comfortable feeling may not be given to a passenger.

Such an abnormality is not considered in Patent Literature 1.

The electric compressor cannot be restarted while rotating backward as described above, although the compressor of Patent Literature 1 using power generated by the engine can be restarted by engaging a clutch even while the compressor rotates backward. The reasons are as follows.

When operating an electric motor for the electric compressor, it is necessary to operate the electric motor after detecting an electrical angle of a rotor. Thus an electrical angle detector detecting the electrical angle of the rotor is needed, however a sensor detecting the electrical angle of the rotor cannot be disposed since the electric motor is located inside the compressor and refrigerant circulates in the compressor. Then, the electrical angle of the rotor is estimated based on a relationship, on a condition that the rotor is stopped, among a voltage applied to the electric motor, a current flowing in the electric motor, and an electrical angle of the rotor. The estimation of the electrical angle can be performed only when the rotor is stopped, thereby the electrical angle cannot be estimated while the electric compressor rotates backward. Therefore, the electric compressor cannot be restarted.

It is an objective of the present disclosure to provide an air conditioner for a vehicle that is capable of restarting a compressor promptly when the compressor is restarted after being stopped in a two-stage compression mode.

According to a first aspect of the present disclosure, an air conditioner for a vehicle supplying air into the vehicle compartment has a compressor, a radiator, a first pressure reducer, a gas-liquid separator, a second pressure reducer, an exterior heat exchanger, an intermediate-pressure refrigerant passage, a switching device, and a controller. The compressor has a suction port, a compression mechanism, a discharge port, an intermediate port, and an electric motor. The suction port draws a low-pressure refrigerant. The compression mechanism compresses the low-pressure refrigerant to be a high-pressure refrigerant. The discharge port discharges the high-pressure refrigerant. The intermediate port draws an intermediate-pressure refrigerant from a cycle and guides the intermediate-pressure refrigerant to flow into the compression mechanism and join a refrigerant being compressed in the compression mechanism. The electric motor operates the compression mechanism. The radiator performs a heat exchange between the air and the refrigerant discharged by the discharge port and makes the refrigerant to radiate heat. The first pressure reducer reduces a pressure of refrigerant flowing out of the radiator to be the intermediate-pressure refrigerant. The gas-liquid separator separates the intermediate-pressure refrigerant, which flows from the first pressure reducer, into a gas-phase refrigerant and a liquid-phase refrigerant. The second pressure reducer reduces a pressure of the liquid-phase refrigerant separated in the gas-liquid separator to be the low-pressure refrigerant. The exterior heat exchanger performs a heat exchange between an outside air from an outside the vehicle compartment and the refrigerant flowing out of the second pressure reducer and evaporates the refrigerant. The intermediate-pressure refrigerant passage guides the gas-phase refrigerant separated in the gas-liquid separator to flow to the intermediate port. The switching device switches between a refrigerant circuit of a two-stage compression mode that guides the intermediate-pressure refrigerant to the intermediate port and a refrigerant circuit of a single-stage compression mode that blocks at least a flow of the intermediate-pressure refrigerant into the intermediate-pressure refrigerant passage and guides the refrigerant remaining in the intermediate-pressure refrigerant passage to flow out of the intermediate-pressure refrigerant passage. The controller controls the compressor and the switching device. The controller, when receiving a compressor stop signal that requests to stop the compressor in the two-stage compression mode, operates the switching device to switch from the refrigerant circuit of the two-stage compression mode to the refrigerant circuit of the single-stage compression mode, operates the compressor in the single-stage compression mode for a specified time and then stops the compressor, and restarts the compressor when the compressor stop signal is canceled.

According to the above-described configuration, the refrigerant remaining in the intermediate pressure refrigerant passage connected to the intermediate port flows out of the intermediate pressure refrigerant passage, and thereby a pressure of the refrigerant at the intermediate port can be decreased, since the compressor is operated in the single-stage compression mode before being stopped. As a result, a pressure difference between the pressure of the refrigerant at the intermediate port and a pressure of the refrigerant at the suction port at a time of stopping the compressor can be reduced, and thereby a backward rotation of the compressor caused after the compressor is stopped can be suppressed.

Therefore, duration from stopping the compressor to restarting the compressor can be shortened as compared to a case that is different from the first aspect of the present disclosure in that the compressor is stopped without switching to the single-stage compression mode when the compressor stop signal is output in the two-stage compression mode. As a result, a decrease degree of a temperature of the air to be blown into the vehicle compartment can be small.

According to a second aspect of the present disclosure, an air conditioner may further has a main power source for the vehicle that supplies power to the compressor and a secondary power source for the vehicle that supplies power to the switching device. The switching device switches from the refrigerant circuit of the two-stage compression mode to the refrigerant circuit of the single-stage compression mode when the secondary power source stops supplying power to the switching device. The controller, when the main power source and the secondary power source are switched to stop supplying power by a user in the two-stage compression mode, operates the secondary power source to stop supplying power to the switching device, operates the compressor to continue operating for a specified time in the single-stage compression mode, and operates the main power source to stop supplying power to the compressor.

According to the above-described second aspect, the compressor can be stopped after continuing operating in the single-stage compression mode for the specified time even when the main power source and the secondary power source are switched from supplying power to being stopped supplying power by the user in the two-stage compression mode. Thus, according to the second aspect, the compressor is operated in the single-stage compression mode before being stopped as in the first aspect, and thereby the backward rotation of the compressor caused after the compressor is stopped can be suppressed. In addition, noise caused due to the backward rotation can be suppressed.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
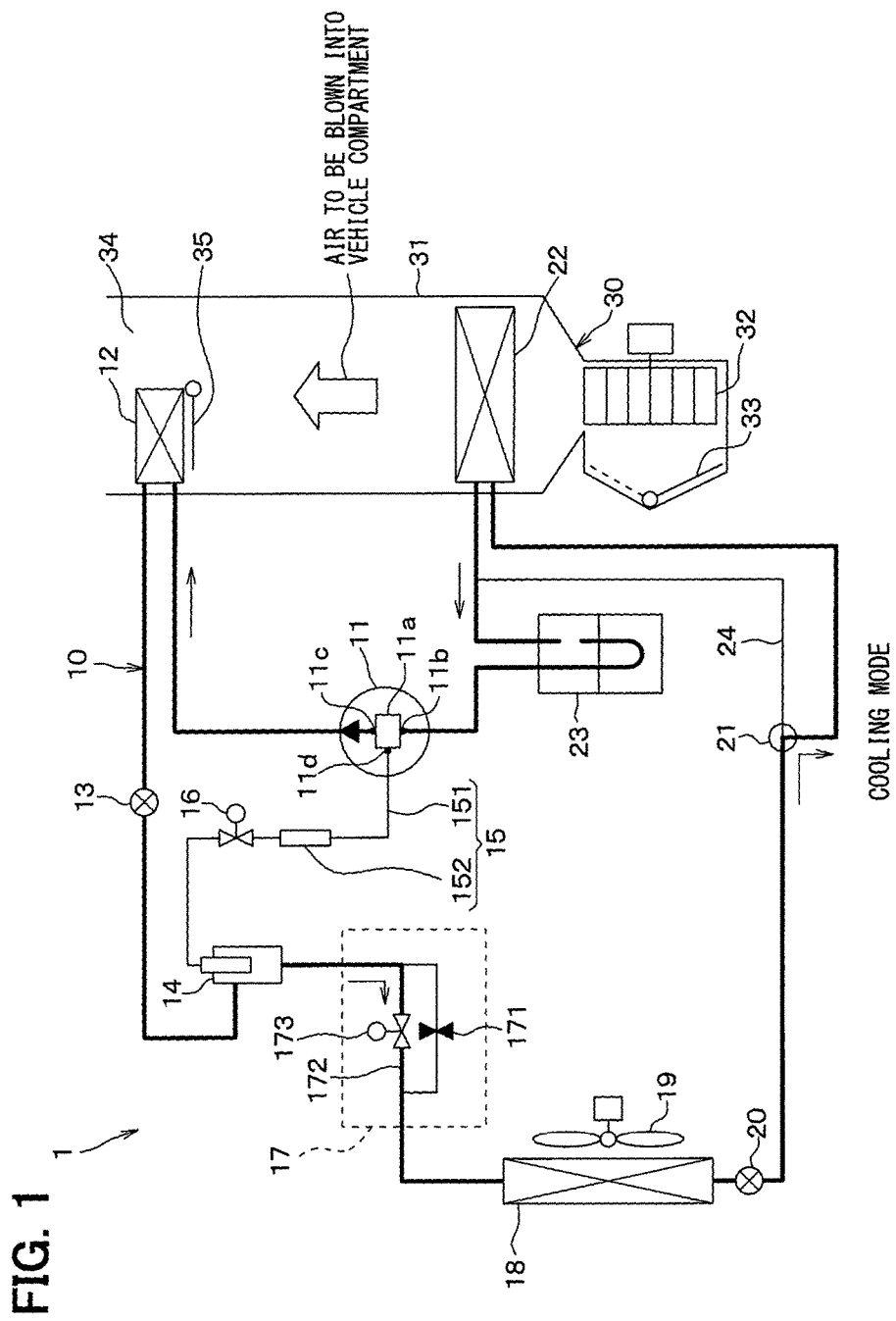
FIG. 1 is a diagram illustrating a configuration of an air conditioner for a vehicle as a whole and showing a refrigerant flow in a cooling mode, according to a first embodiment.
Figure 2:
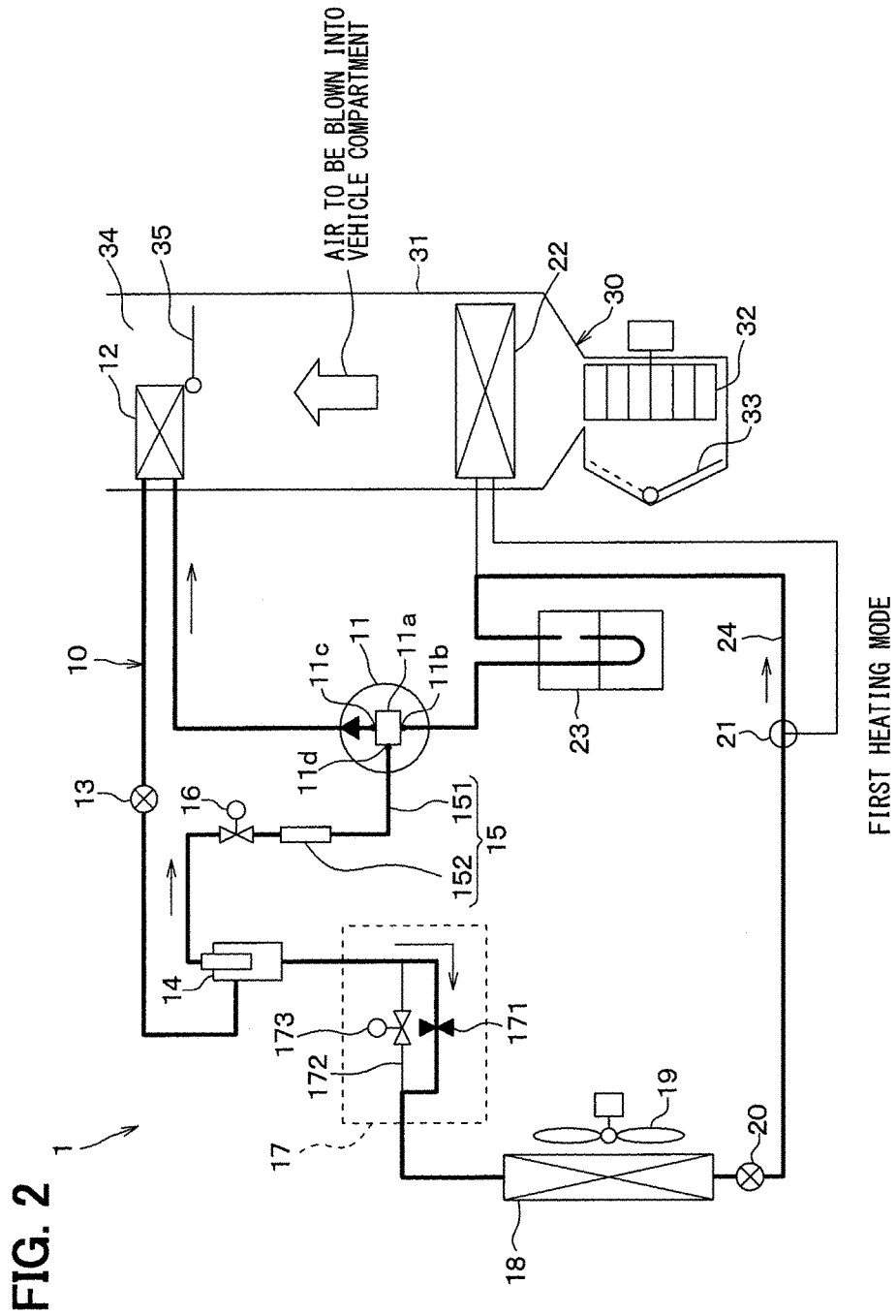
FIG. 2 is a diagram illustrating the configuration of the air conditioner for a vehicle as a whole and showing a refrigerant flow in a first heating mode (i.e., a two-stage compression mode), according to the first embodiment.
Figure 3:
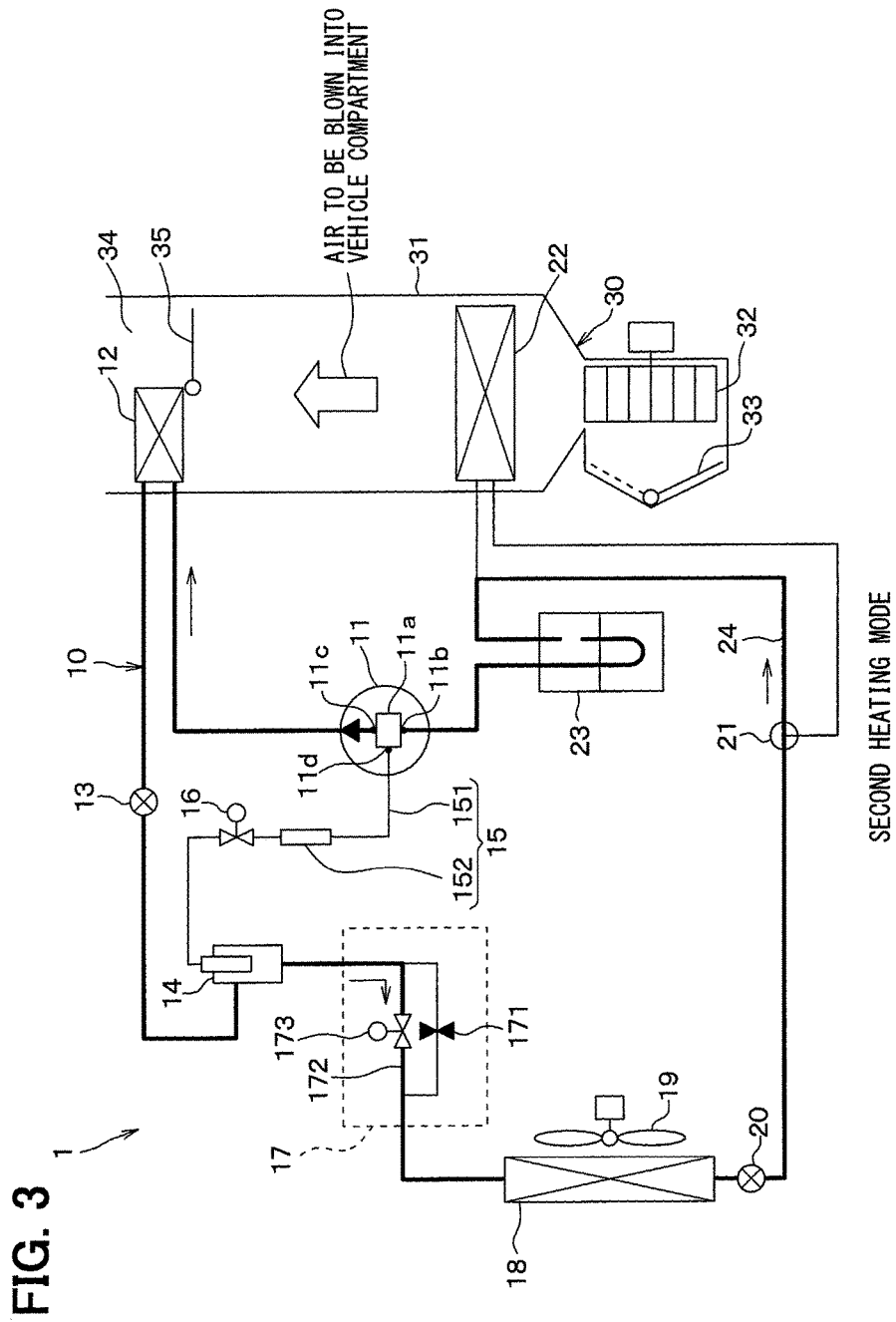
FIG. 3 is a diagram illustrating the configuration of the air conditioner for a vehicle as a whole and showing a refrigerant flow in a second heating mode, according to the first embodiment.

FIG. 1 to FIG. 3 illustrates a vehicle air conditioner 1 for a vehicle according to the present embodiment. The vehicle air conditioner 1 is disposed in a hybrid vehicle that uses power generated by both of an internal combustion engine (i.e., an engine) and an electric motor generating power for moving the hybrid vehicle. The vehicle air conditioner 1 blows air toward a vehicle compartment that is an air conditioning target space. The vehicle air conditioner 1 has a heat pump cycle 10 and an interior air conditioning unit 30.

The heat pump cycle 10, in the vehicle air conditioner 1, cools and heats the air that is air to be blown into the vehicle compartment. Therefore, the heat pump cycle 10 is configured to be capable of switching between a cooling refrigerant circuit of a cooling mode shown in FIG. 1 and a heating refrigerant circuit of a first heating mode shown in FIG. 2 or a second heating mode shown in FIG. 3. When the cooling refrigerant circuit is set, the heat pump cycle 10 cools the air and thereby cooling the vehicle compartment. When the heating refrigerant circuit is set, the heat pump cycle 10 heats the air and thereby heating the vehicle compartment. The first heating mode is operated when outside temperature is extremely low, e.g., lower than or equal to 0° C. The second heating mode is a normal heating mode.

The heat pump cycle 10 uses well-known fluorocarbon refrigerant as the refrigerant and configures a subcritical refrigeration cycle which is a vapor compression type cycle and in which a temperature of high-pressure refrigerant do not exceed a critical pressure.

The heat pump cycle 10 of the present embodiment has a compressor 11, an interior condenser 12, a first pressure reducer 13, a gas-liquid separator 14, an intermediate-pressure refrigerant passage 15, an intermediate pressure switching valve 16, a second pressure reducer 17, an exterior heat exchanger 18, a third pressure reducer 20, a three-way valve 21, an interior evaporator 22, an accumulator 23, and a second bypass passage 24.

The compressor 11 is located inside a hood of the vehicle and configures the heat pump cycle 10. The compressor 11 is an electric compressor that draws refrigerant, compresses the refrigerant, and discharges the compressed refrigerant.

The compressor 11 has a compression chamber 11a, a suction port 11b, a discharge port 11c, and an intermediate port 11d. The suction port 11b draws a low-pressure refrigerant and guides the low-pressure refrigerant to the compression chamber 11a. The compression chamber 11a compresses the low-pressure refrigerant to be a high-pressure refrigerant. The discharge port 11c discharges the high-pressure refrigerant. The intermediate port 11d guides an intermediate-pressure refrigerant to flow from the heat pump cycle 10 into the compression chamber 11a and to join refrigerant being compressed in the compression chamber 11a. The high-pressure refrigerant is a refrigerant that has a higher pressure as compared to the low-pressure refrigerant. The intermediate-pressure refrigerant is a refrigerant of which pressure is between a pressure of the low-pressure refrigerant drawn into the compression chamber 11a and a pressure of the high-pressure refrigerant flowing out of the compression chamber 11a.

Figure 4:
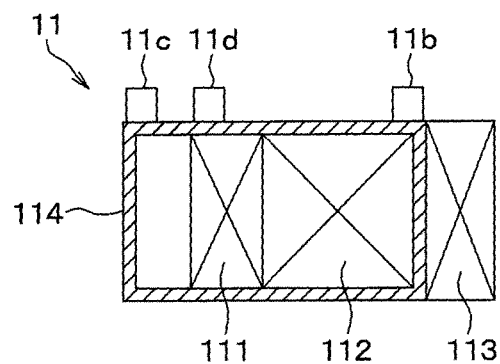
FIG. 4 is a cross-sectional view illustrating a configuration of a compressor according to the first embodiment.

More specifically, the compressor 11 has a compression mechanism 111, an electric motor 112, and an inverter 113 as shown in FIG. 4. The compression mechanism 111 compresses the refrigerant in the compression chamber 11a. The electric motor 112 operates the compression mechanism 111 rotatably. The inverter 113 is an operation control circuit that operates the electric motor 112. The compression mechanism 111 and the electric motor 112 are housed in a housing 114. The inverter 113 is located outside the housing and arranged adjacent to the housing 114.

The compression mechanism 111 is a scroll compression mechanism. However, the compression mechanism 111 is not limited to the scroll compression mechanism and may be another compression mechanism such as a vane compression mechanism as long as being a rotary compression mechanism.

The electric motor 112 is an AC motor of which operation (i.e., a rotational speed) is controlled depending on an AC voltage output by the inverter 113. The inverter 113 is connected to a high-voltage power supply that supplies electric power to a main mechanism such as the electric motor generating power for moving the vehicle. An air conditioning ECU 40, which will be described later, outputs a control signal regarding a target rotational speed of the electric motor 112, and the inverter 113 outputs AC voltage corresponding to the control signal from the air conditioning ECU 40.

The housing 114 has the suction port 11b, the discharge port 11c, and the intermediate port 11d. A gas-phase refrigerant flows in the housing 114 from the suction port 11b to the discharge port 11c. The intermediate port 11d communicates with a portion of the compression chamber 11a that compresses the refrigerant.

As described above, the compressor 11 of the present embodiment draws the low-pressure refrigerant from the suction port 11b, compresses the low-pressure refrigerant in the compression mechanism 111 to be the high-pressure refrigerant, and then discharges the high-pressure refrigerant from the discharge port 11c. In addition, the compressor 11 draws the intermediate-pressure refrigerant from the heat pump cycle 10 through the intermediate port 11d and guides the intermediate-pressure refrigerant to join the refrigerant being compressed in the compression mechanism 111.

The interior condenser 12 has a refrigerant inlet that is connected to the discharge port 11c of the compressor 11. The interior condenser 12 is located in a housing 31 of the interior air conditioning unit 30 that will be described later. The interior condenser 12 is a radiator that performs a heat exchange between a discharged refrigerant (i.e., the high-pressure refrigerant), which is discharged by the compressor 11 and has a high pressure, and the air, which passes through the interior evaporator 22 and is blown into the vehicle compartment. As a result, the discharged refrigerant radiates heat and thereby heating the air to be blown into the vehicle compartment.

The first pressure reducer 13 has a refrigerant inlet that is connected to a refrigerant outlet of the interior condenser 12. The first pressure reducer 13, in the first heating mode, reduces a pressure of the refrigerant flowing from the interior condenser 12 to be the intermediate-pressure refrigerant. The first pressure reducer 13, in the second heating mode, reduces a pressure of the refrigerant flowing from the interior condenser 12 to be the low-pressure refrigerant. The first pressure reducer 13 is an electric expansion valve. That is, the first pressure reducer 13 is an electric variable throttle mechanism that has a valve body and an electric actuator. The valve body is configured such that an opening degree of the valve body is variable. The electric actuator changes the opening degree of the valve body. The first pressure reducer 13 reduces the pressure of the refrigerant when the opening degree is decreased and does not reduce the pressure of the refrigerant when being fully open.

The gas-liquid separator 14 has a refrigerant inlet that is connected to a refrigerant outlet of the first pressure reducer 13. The gas-liquid separator 14 separates the refrigerant flowing from the first pressure reducer 13 into a gas-phase refrigerant and a liquid-phase refrigerant. According to the present embodiment, the gas-liquid separator 14 is a centrifugal separation type that separates the refrigerant into the gas-phase refrigerant and the liquid-phase refrigerant using centrifugal force. The gas-liquid separator 14 has a gas-phase refrigerant outlet connected to the intermediate pressure refrigerant passage 15 and a liquid-phase refrigerant outlet connected to a refrigerant inlet of the second pressure reducer 17.

The intermediate pressure refrigerant passage 15 guides the gas-phase refrigerant separated in the gas-liquid separator 14 to the intermediate port 11d of the compressor 11. The intermediate pressure refrigerant passage 15 has a refrigerant pipe 151 and a muffler 152. The muffler 152 is a passage defining member that reduces a pulsation of the refrigerant flowing in the intermediate pressure refrigerant passage 15 and that has a larger capacity as compared to the refrigerant pipe 151.

The intermediate pressure switching valve 16 is a switching valve that is located in the intermediate pressure refrigerant passage 15 and that opens and closes the intermediate pressure refrigerant passage 15. According to the present embodiment, the intermediate pressure switching valve 16 is an electromagnetic valve. The air conditioning ECU 40 outputs a controls signal, and an operation of the intermediate pressure switching valve 16 is controlled based on the control signal. As described later, the intermediate pressure switching valve 16 is open in the first heating mode. As a result, a refrigeration circuit of a two-stage compression mode, in which the intermediate-pressure refrigerant is introduced into the intermediate port 11d, is provided. The intermediate pressure switching valve 16 is closed when a compressor stop request that requests to the stop compressor 11 is made in the first heating mode. As a result, a flow of the intermediate-pressure refrigerant into the intermediate pressure refrigerant passage 15 is blocked, and a refrigerant circuit of the single-stage compression mode, in which the refrigerant remaining in the intermediate pressure refrigerant passage 15 flows out of the intermediate pressure refrigerant passage 15, is provided. Thus, the intermediate pressure switching valve 16 configures a switching device that switches between the refrigerant circuit of the two-stage compression mechanism and the refrigerant circuit of the single-stage compression mechanism.

The second pressure reducer 17, in the first heating mode, reduces a pressure of the intermediate-pressure liquid-phase refrigerant separated in the gas-liquid separator 14 to be the low-pressure refrigerant. The second pressure reducer 17, in the cooling mode and the second heating mode, does not exert a pressure reducing effect on the intermediate-pressure liquid-phase refrigerant. Thus, the second pressure reducer 17 exerts the pressure reducing effect when being on a throttle condition and does not exerts the pressure reducing effect when being fully open.

The second pressure reducer 17 has a fixed throttle 171, a first bypass passage 172, and a switching valve 173 according to the present embodiment. The fixed throttle 171 reduces a pressure of the refrigerant. The fixed throttle 171 is may be configured by a nozzle of which throttle degree is fixed or an orifice. The first bypass passage 172 guides the refrigerant flowing out of the gas-liquid separator 14 to bypass the fixed throttle 171 and to flow to the exterior heat exchanger 18. The switching valve 173 is an electromagnetic valve that opens and closes the first bypass passage 172. An operation of the switching valve 173 is controlled based on a control signal output from the air conditioning ECU 40. The second pressure reducer 17 is switched between a condition exerting the pressure reducing effect and a condition not exerting the pressure reducing effect by opening and closing the switching valve 173.

The exterior heat exchanger 18 has a refrigerant inlet that is connected to a refrigerant outlet of the second pressure reducer 17. The exterior heat exchanger 18 is located in the hood of the vehicle, i.e., outside the vehicle compartment. The exterior heat exchanger 18 performs a heat exchange between the refrigerant flowing in the exterior heat exchanger 18 and air (i.e., the outside air) introduced from an outside of the vehicle compartment by a blower fan 19. The exterior heat exchanger 18, in the first and second heating modes, evaporates the low-pressure refrigerant thereby making the low-pressure refrigerant absorb heat. The exterior heat exchanger 18, in the cooling mode, serves as a radiator that makes the high-pressure refrigerant radiate heat.

The third pressure reducer 20 has a refrigerant inlet that is connected to a refrigerant outlet of the exterior heat exchanger 18. The third pressure reducer 20, in the cooling mode, reduces a pressure of the refrigerant that flows out of the exterior heat exchanger 18 and flows into the interior evaporator 22. The third pressure reducer 20 is an electric expansion valve having a similar configuration as the first pressure reducer.

The three-way valve 21 has a refrigerant inlet and two refrigerant outlets. The refrigerant inlet is connected to a refrigerant outlet of the third pressure reducer 20. The two refrigerant outlets are connected to a refrigerant inlet of the interior evaporator 22 and a refrigerant inlet of the accumulator 23 respectively. The three-way valve 21 is a refrigerant passage switching device that switches between a refrigerant circuit in which the refrigerant flowing out of the third pressure reducer 20 flows to the interior evaporator 22 and a refrigerant circuit in which the refrigerant flowing out of the third pressure reducer 20 flows to the accumulator 23 while bypassing the interior evaporator 22. An operation of the three-way valve 21 is controlled based on a control signal output from the air conditioning ECU 40.

The interior evaporator 22 is located upstream of the interior condenser 12 in an air flow direction of the air in the housing 31 of the interior air conditioning unit 30. The interior evaporator 22, in the cooling mode, performs a heat exchange between the refrigerant flowing in the interior evaporator 22 and the air to be blown into the vehicle compartment, such that the refrigerant is evaporated by absorbing heat and thereby cooling the air.

The accumulator 23 has the refrigerant inlet that is connected to a refrigerant outlet of the interior evaporator 22 and the second bypass passage 24. The accumulator 23 is a gas-liquid separator that separates the refrigerant flowing therein into a gas-phase refrigerant and a liquid-phase refrigerant and that stores an excess refrigerant of the heat pump cycle 10. The accumulator 23 has a gas-phase refrigerant outlet that is connected to the suction port 11b of the compressor 11.

The interior air conditioning unit 30 will be described hereafter. The interior air conditioning unit 30 is arranged inside a dashboard (i.e., an instrument panel) located in a forefront of the vehicle compartment and blows the air into the vehicle compartment after adjusting a temperature of the air. The interior air conditioning unit 30 has the housing 31 that provides an exterior wall of the interior air conditioning unit 30 and that houses the interior condenser 12 and the interior evaporator 22.

The housing 31 defines an air passage therein, and the air to be blown into the vehicle compartment flows in the air passage. An inside/outside air switching device 33 is located in a most upstream portion of the housing 31 in the air flow direction. The inside/outside air switching device 33 introduces air (i.e., an inside air) inside the vehicle compartment and the outside air selectively.

In the housing 31, a blower 32 is located downstream of the inside/outside air switching device 33. The blower 32 blows air, which is introduced from the inside/outside air switching device 33, toward the vehicle compartment. The blower 32 is an electric blower that has a centrifugal multi-blade fan operated by an electric motor.

The interior evaporator 22 and the interior condenser 12 are located downstream of the blower 32 and arranged in this order in the air flow direction. The housing 31 further has a bypass passage 34 therein. The bypass passage 34 guides the air after passing through the interior evaporator 22 to bypass the interior condenser 12.

Furthermore, an air passage switching door 35 is located downstream of the interior evaporator 22 and upstream of the interior condenser 12 in the air flow direction. The air passage switching door 35 switches an air passage, in which the air after passing through the interior evaporator 22 flows, between the bypass passage 34 and an air passage in which the air flows through the interior condenser 12.

The housing 31 has an opening that is connected to an air outlet opening in the vehicle compartment. The opening is located in a most downstream portion of the housing 31 in the air flow direction. The air of which temperature is adjusted in the interior evaporator 22 or the interior condenser 12 is blown into the vehicle compartment from the air outlet through the opening.

Figure 5:
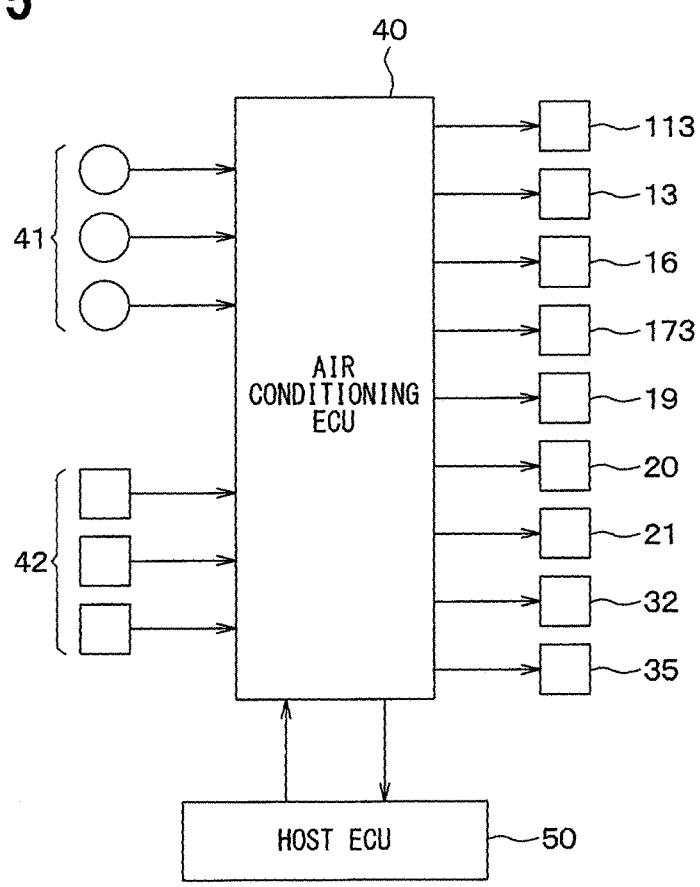
FIG. 5 is a block diagram illustrating an electronic control unit according to the first embodiment.

The vehicle air conditioner 1 has the air conditioning ECU 40 as shown in FIG. 5. The air conditioning ECU 40 is an electronic control unit that is configured by a well-known microcomputer including CPU, ROM and RAM and a peripheral circuit thereof.

An output side of the air conditioning ECU 40 is connected to various devices such as the inverter 113 of the compressor 11, the first pressure reducer 13, the intermediate pressure switching valve 16, the switching valve 173, the blower fan 19, the third pressure reducer 20, the three-way valve 21, the blower 32, and the air passage switching door 35.

An input side of the air conditioning ECU 40 is connected to various sensors 41 for controlling an air conditioning. The various sensors 41 include an inside air temperature sensor, an outside air temperature sensor, an insolation sensor, an evaporator temperature sensor, and a discharge pressure sensor. The inside air temperature sensor detects a temperature of the inside air. The outside air temperature sensor detects a temperature of the outside air. The insolation sensor detects an amount of insolation inside the vehicle compartment. The evaporator temperature sensor detects a temperature of the interior evaporator 22. The discharge pressure sensor detects a pressure of the high-pressure refrigerant discharged by the compressor 11.

The input side of the air conditioning ECU 40 is further connected to an operation panel (not shown) that is arranged adjacent to the instrument panel. The operation panel has various air conditioning operation switches 42, and operational signals from the air conditioning operation switches 42 are input to the air conditioning ECU 40. The air conditioning operation switches 42 include an operation switch for the vehicle air conditioner 1, a temperature setting switch that sets a target temperature in the vehicle compartment, and a selection switch that sets the cooling mode and the heating mode selectively.

The air conditioning ECU 40 uses sensor signals from the sensors 41 and operational signals from the air conditioning operation switches 42 to perform various calculations and processing based on an air conditioning program stored in the ROM etc., and then controls operations of the various devices connected to the output side of the air conditioning ECU 40. For example, the air conditioning ECU 40 outputs a control signal regarding a target rotational speed of the compressor 11 to the inverter 113. The inverter 113 outputs AC voltage with a frequency depending on the control signal. Thus, the rotational speed of the compressor 11 is controlled.

The air conditioning ECU 40 is electrically connected to a host ECU 50, thereby the air conditioning ECU 40 and the host ECU 50 are capable of electrically communicate with each other. Accordingly, the host ECU is capable of controlling the various devices, which are connected to the air conditioning ECU 40, through the air conditioning ECU 40. The host ECU 50 is an electronic control unit that controls a traveling system of the vehicle. Specifically, the host ECU 50 controls a main mechanism such as the motor and the engine based on, e.g., a pressing amount of an acceleration pedal (not shown). The host ECU 50 controls an electrical supply from the power supply disposed in the vehicle to the main mechanism.

When power is necessary to be secured for accelerating the vehicle, the host ECU 50 outputs a compressor stop signal that requests the air conditioning ECU 40 to stop the compressor 11, and thereby the compressor 11 is stopped. The compressor 11 can be restarted when the host ECU 50 stops outputting the compressor stop signal. According to the present embodiment, the case where the power is necessary to be secured for accelerating the vehicle means a case where a condition is switched from a condition that only the motor of the engine and the motor is operated to a condition that the engine is started in addition to the motor.

A control process operated by the air conditioning ECU 40 to operate the various devices will be described hereafter.

The air conditioning ECU 40 operates a normal control to control the various devices depending on an operational mode of the cooling mode, the first heating mode, and the second heating mode. When a compressor stop request to stop the compressor 1 is made by the host ECU 50, the air conditioning ECU 40 performs a temporary stop control to stop the compressor 11 temporary in priority to the normal control. The air conditioning ECU 40 and the inverter 113 correspond to a controller of the present disclosure according to the present embodiment.

Figure 6:
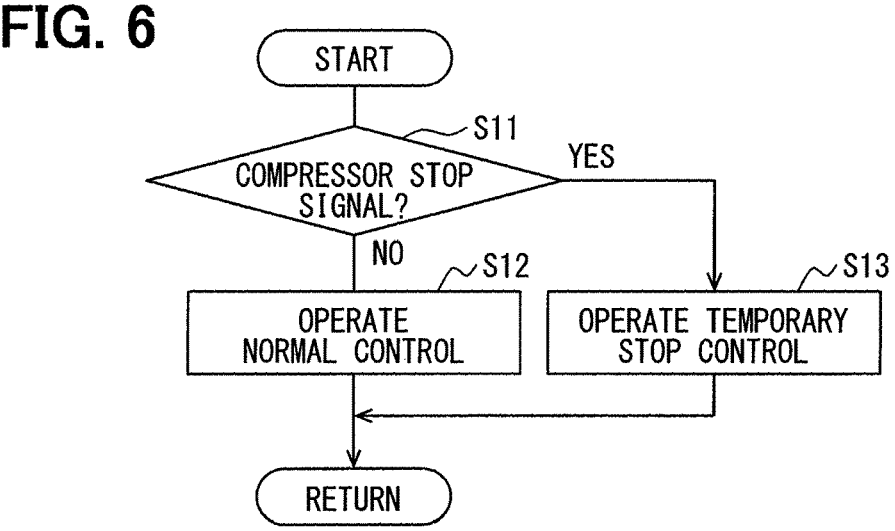
FIG. 6 is a flow chart showing a control operated by an air conditioning ECU according to the first embodiment.
Figure 7:
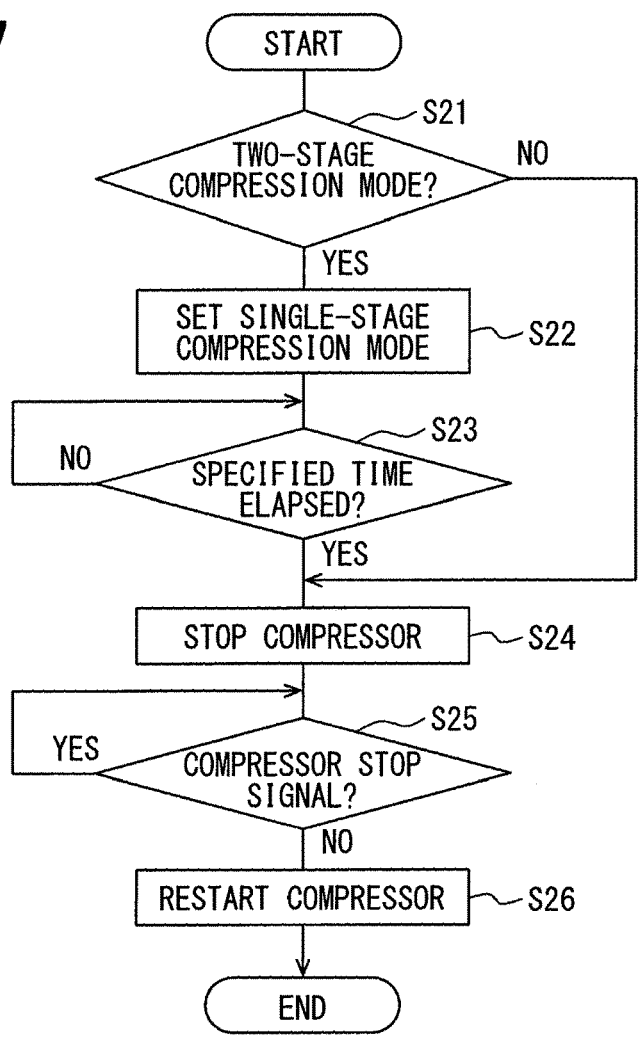
FIG. 7 is a flow chart showing a temporary stop control operated by the air conditioning ECU according to the first embodiment.

Specifically, the air conditioning ECU 40 operates control processes shown in FIG. 6 and FIG. 7. The control processes shown in FIG. 6 and FIG. 7 are operated when an ignition switch is on, i.e., the vehicle is on a condition being capable of moving, and the operation switch of the operation panel is on. Steps shown in FIG. 6 and FIG. 7 correspond to sections performing the various processes.

As shown in FIG. 6, the air conditioning ECU 40 determines whether the compressor stop request to stop the compressor 11 is made by the host ECU 50 at step S11. When the compressor stop request is not made by the host ECU 50, the air conditioning ECU 40 determines the compressor stop request is not made (S11: NO) and then advancing to step S12 to operate the normal control. When the compressor stop request is made by the host ECU 50, the air conditioning ECU 40 determines the compressor stop request is made (S11: YES) and then advancing to step S13 to operate the temporary stop control. Thus, the air conditioning ECU 40 performs the normal control or the temporary stop control based on the above-described determinations.

The normal control will be described hereafter. In the normal control, the air conditioning ECU 40 sets refrigerant circuits corresponding to operation modes of the heat pump cycle 10 and controls the various devices to make required air conditioning states corresponding to the operation modes.

(A) Cooling Mode

The cooling mode is started, e.g., when the operation switch of the operation panel is on and the cooling operation is set by the selection switch.

In the cooling mode, the air conditioning ECU 40 fully opens the first pressure reducer 13 thereby the first pressure reducer 13 does not exert the pressure reducing effect. The air conditioning ECU 40 reduces the opening degree of the third pressure reducer 20 thereby the third pressure reducer 20 exerts the pressure reducing effect. In addition, the air conditioning ECU 40 opens the switching valve 173 and fully opens the second pressure reducer 17 thereby the second pressure reducer 17 does not exert the pressure reducing effect. The air conditioning ECU closes the intermediate pressure switching valve 16 and operates the three-way valve 21 to open the second bypass passage 24.

The air conditioning ECU also calculates a target blowing temperature TAO based on detection signals from the sensors 41 and the operation signals from the operation panel. The target blowing temperature TAO is a target temperature of the air to be blown into the vehicle compartment. The air conditioning ECU determines operation states of the various devices such as the compressor 11, the blower 32 and the air passage switching door 35 based on the target blowing temperature TAO and the detection signals form the sensors 41 and then outputs control signals to make required operation states of the various devices. Accordingly, for example, the compressor 11 and the blower 32 rotate at required rotational speeds respectively. A door of the inside/outside air switching device 33 and the air passage switching door 35 rotate to required positions respectively. The required position of the air passage switching door 35 is a position that makes an entirety of the air blown by the blower 32 flow through the bypass passage 34 in a manner that the air passage switching door 35 closes the air passage in which the air passes through the interior condenser 12 and opens the air passage in which the air flows in the bypass passage 34.

Thus, the heat pump cycle 10 is set to the refrigerant circuit of the cooling mode in which the refrigerant flows as shown by thick lines and arrows in FIG. 1. That is, in the refrigerant circuit of the cooling mode, the refrigerant discharged from the discharge port 11c of the compressor 11 returns to the suction port 11b of the compressor 11 after passing through the interior condenser 12, the first pressure reducer 13 on a condition of being fully opened, the gas-liquid separator 14, the second pressure reducer 17 on a condition of being fully opened, the exterior heat exchanger 18, the third pressure reducer 20 on a condition that the opening degree thereof is decreased, the interior evaporator 22, and the accumulator 23 in this order.

In the cooling mode, the high-pressure refrigerant discharged from the discharge port 11c of the compressor 11 radiates heat by exchanging the heat with the outside air in the exterior heat exchanger 18. The refrigerant flowing out of the exterior heat exchanger 18 is decompressed and expanded in the third pressure reducer 20 to be the low-pressure refrigerant and then evaporates in the interior evaporator 22 by absorbing heat from air blown by the blower 32. As a result, the air to be blown into the vehicle compartment is cooled. On this occasion, the high-pressure refrigerant flowing into the interior condenser 12 flows out of the interior condenser 12 substantially without radiating heat to the air since the air passage switching door 35 closes the air passage in which the air flows through the interior condenser 12. Accordingly, the air cooled by the interior evaporator 22 is supplied to the vehicle compartment.

(B) Heating Mode

The heating mode is started, for example, when the heating mode is set by the selection switch while the operation switch of the operation panel is on (ON). As the heating mode, the first heating mode is performed when the outside temperature is extremely low, and the second heating mode is performed when the outside temperature is not extremely low. For example, the air conditioning ECU 40 operates the first heating mode when a detected temperature detected by the outside air sensor is lower than or equal to a reference temperature, e.g., 0° C., and operates the second heating mode when the detected temperature is higher than the reference temperature.

(B1) First Heating Mode

In the first heating mode, the air conditioning ECU 40 decreases the opening degree of the first pressure reducer 13 and fully opens the third pressure reducer 20. The air conditioning ECU 40 also closes the switching valve 173 and decreases the opening degree of the second pressure reducer 17. In addition, the air conditioning ECU 40 opens the intermediate pressure switching valve 16 and opens the refrigerant outlet of the three-way valve 21 connected to the second bypass passage 24.

As in the cooling mode, the air conditioning ECU 40 determines operation states of the various devices based on the target blowing temperature TAO etc. and then outputs control signals to make the operation states. Accordingly, for example, the air passage switching door 35 is positioned to close the bypass passage 34 such that the entire volume of the air after passing through the interior evaporator 22 flows through the interior condenser 12.

Thus, the heat pump cycle 10 is set to the refrigerant circuit (i.e., a gas injection cycle) of the first heating mode in which the refrigerant flows as shown by thick lines and arrows in FIG. 2. That is, the high-pressure refrigerant discharged from the discharge port 11c of the compressor 11 is condensed in the interior condenser 12, and the condensed high-pressure refrigerant is decompressed in the first pressure reducer 13 to be the intermediate-pressure refrigerant. The intermediate-pressure refrigerant flowing out of the first pressure reducer 13 is separated into an intermediate-pressure gas-phase refrigerant and an intermediate-pressure liquid-phase refrigerant in the gas-liquid separator 14. The intermediate-pressure liquid-phase refrigerant separated in the gas-liquid separator 14 is decompressed in the second pressure reducer 17 to be the low-pressure refrigerant. The low-pressure refrigerant flowing out of the second pressure reducer 17 evaporates in the exterior heat exchanger 18, passes through the accumulator 23, and then is drawn into the suction port 11b of the compressor 11. On the other hand, the intermediate-pressure gas-phase refrigerant separated in the gas-liquid separator 14 flows to the intermediate port 11d of the compressor through the intermediate pressure refrigerant passage 15 and then joins the refrigerant being compressed in the compressor 11.

Thus, in the first heating mode, the heat pump cycle 10 is set to the gas injection cycle (i.e., the two-stage compression cycle) in which the low-pressure refrigerant decompressed in the second pressure reducer 17 is drawn into the compressor 11 and the intermediate-pressure refrigerant decompressed in the first pressure reducer 13 joins the refrigerant being compressed in the compressor 11. Therefore, the first heating mode is the two-stage compression mode according to the present embodiment.

In the first heating mode, the air to be blown into the vehicle compartment is not cooled in the interior evaporator 22 since the refrigerant does not flow in the interior evaporator 22. The air after passing through the interior evaporator 22 is heated in the interior condenser 12 by exchanging heat with the high-pressure refrigerant and then is blown into the vehicle compartment.

(B2) Second Heating Mode

In the second heating mode, the air conditioning ECU 40 decreases the opening degree of the first pressure reducer 13 and fully opens the third pressure reducer 20. The air conditioning ECU 40 also opens the switching valve 173 and fully opens the second pressure reducer 17. In addition, the air conditioning ECU 40 closes the intermediate pressure switching valve 16 and opens the refrigerant outlet of the three-way valve 21 connected to the second bypass passage 24.

As in the first heating mode, the air conditioning ECU 40 determines the operation states of the various devices based on the target blowing temperature TAO etc., and outputs control signals to make the operation states.

As a result, the heat pump cycle 10 is set to the refrigerant circuit of the second heating mode in which the refrigerant flows as shown by thick lines and arrows in FIG. 3. That is, the high-pressure refrigerant discharged from the discharge port 11c of the compressor 11 is condensed in the interior condenser 12, and the condensed high-pressure refrigerant is decompressed in the first pressure reducer 13 to be the low-pressure refrigerant. The low-pressure refrigerant flowing out of the first pressure reducer 13 flows into the gas-liquid separator 14. On this occasion, the low-pressure refrigerant flowing into the gas-liquid separator 14 flows into the exterior heat exchanger 18 without flowing into the intermediate pressure refrigerant passage 15 since the intermediate pressure switching valve 16 is closed. The low-pressure refrigerant flowing into the exterior heat exchanger 18 evaporates by exchanging heat with the outside air, flows through the accumulator 23, and then is drawn into the suction port 11b of the compressor 11.

In the second heating mode, the air to be blown into the vehicle compartment is not cooled in the interior evaporator 22 since the refrigerant does not flow in the interior evaporator 22 as in the first heating mode. The air after passing through the interior evaporator 22 is heated in the interior condenser 12 by exchanging heat with the high-pressure refrigerant and then is supplied to the vehicle compartment.

The temporary stop control that is performed at step S13 in FIG. 6 and stops the compressor 11 temporary will be described hereafter. The temporary stop control is performed while the compressor 11 is operated in the normal control such that the compressor 11 is stopped temporary and is restarted when a specified condition is met.

As shown in FIG. 7, the air conditioning ECU 40 determines whether a present operation mode is the two-stage compression mode or not at step S21. The two-stage compression mode corresponds to the above-described first heating mode. When the present operation mode is determined not to be the first heating operation (S21: NO), the control flow advances to step S24 and the air conditioning ECU 40 stops the compressor 11. On the other hand, when the present operation mode is determined to be the first heating operation (S21: YES), the control flow advances to step S22.

At step S22, the air conditioning ECU 40 switches the refrigerant circuit from the refrigerant circuit of the two-stage compression mode to the refrigerant circuit of the single-stage compression mode. Specifically, the air conditioning ECU 40 switches the intermediate pressure switching valve 16 from a condition of being open to a condition of being closed. As for the operation states of the various devices such as the compressor 11, the first pressure reducer 13, the third pressure reducer 20, the switching valve 173, the three-way valve 21, the blower 32, and the air passage switching door 35, the operation states in the first heating operation are maintained. The reason why the operation states in the first heating operation are maintained is that time from starting the single-stage compression mode to restarting the compressor 11 is short as described later.

Figure 8:
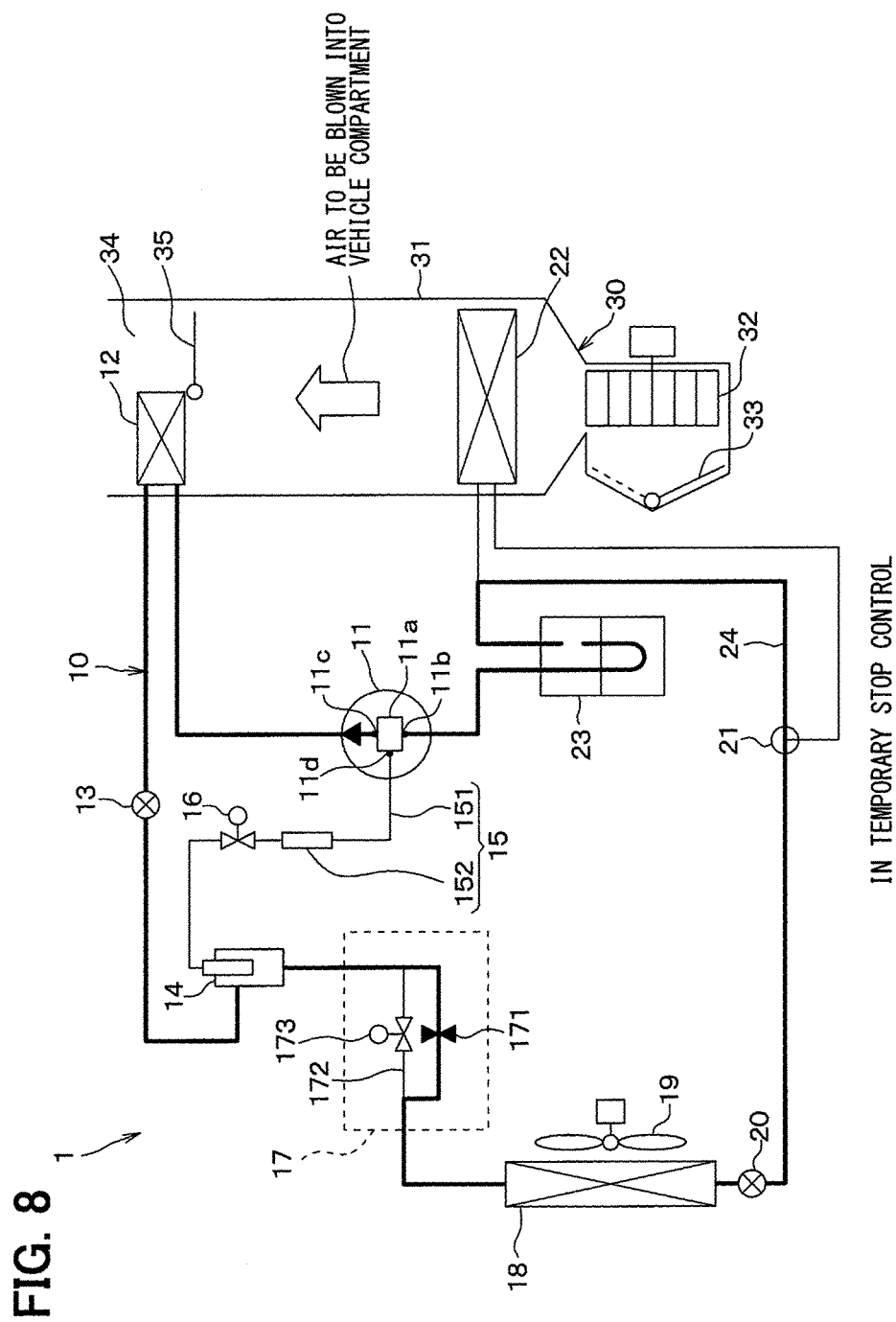
FIG. 8 is a diagram illustrating a refrigerant circuit of a single-compression mode according to the first embodiment.

Thus, the heat pump cycle 10 is set to the refrigerant circuit of the single-stage compression mode in which the refrigerant flows as shown by thick lines and arrows in FIG. 8. The refrigerant circuit is different from the refrigerant circuit of the first heating mode shown in FIG. 2 in that a flow of the intermediate-pressure refrigerant to the intermediate pressure refrigerant passage 15 is inhibited and the refrigerant remaining in the intermediate pressure refrigerant passage 15 flows out of the intermediate pressure refrigerant passage 15. Other flows of the refrigerant are the same as those in the refrigerant circuit of the first heating operation.

Subsequently, the air conditioning ECU 40, at step S23, determines whether a specified time elapses after starting the compressor 11 in the refrigerant circuit of the single-stage compression mode. That is, the air conditioning ECU 40 determines whether the specified time elapses after switching the refrigerant circuit from the refrigerant circuit of the two-stage compression mode to the refrigerant circuit of the single-stage compression mode. The specified time is set such that a pressure difference between a pressure of the refrigerant at the intermediate port 11d of the compressor 11 and a pressure of the refrigerant at the suction port 11b of the compressor 11 becomes smaller than or equal to a specified value. The specified value is a value that is capable of suppressing a backward rotation of the compressor 11 caused after stopping the compressor 11 and that is determined by experiments etc. For example, the specified value is set in a range of 200 milliseconds to 1 second.

When it is determined the specified time elapses (S23: YES), the control flow advances to step S24 and the air conditioning ECU 40 stops the compressor 11. On the other hand, when it is determined the specified time does not elapses (S23: NO), the control flow returns to step S23. Step S23 is performed repeatedly until the specified time elapses. As a result, the compressor 11 continues operating in the refrigerant circuit of the single-stage compression mode for the specified time.

Subsequently, the air conditioning ECU 40, at step S25, determines whether the host ECU 50 outputs the compressor stop signal that requests to stop the compressor 11. When it is determined the compressor stop signal is not output (S25: NO), the control flow advances to step S26 and the air conditioning ECU 40 restarts the compressor 11. On the other hand, when it is determined the compressor stop signal is output (S25: YES), step S25 is performed again. Step S25 is performed repeatedly until the air conditioning ECU 40 reads the compressor stop signal.

Accordingly, the compressor 11 is restarted when the host ECU 50 stops outputting the compressor stop signal, i.e., the compressor stop signal from the host ECU 50 is canceled.

Thus, the temporary stop control that stops the compressor 11 temporary is performed. After completing the temporary stop control, the air conditioning ECU 40 operates the normal control. Specifically, the air conditioning ECU 40 performs the first heating mode in a case where there is no change in a thermal load condition.

As described above, according to the present embodiment, the air conditioning ECU 40 performs the following operations at steps S11, S13, S21, S22, S23 and S24 when the host ECU 50 outputs the compressor stop signal in the first heating mode. That is, the air conditioning ECU 40 closes the intermediate pressure switching valve 16 to switch from the refrigerant circuit of the first heating mode to the refrigerant circuit of the single-stage compression mode shown in FIG. 8. The air conditioning ECU 40 makes the compressor 11 to continue operating for the specified time in the single-stage compression mode and then stops the compressor 11. When the compressor stop signal from the host ECU 50 is canceled, the air conditioning ECU 40 restarts the compressor 11 at steps S25 and S26.

Thus, the compressor 11 operates in the single-stage compression mode before being stopped when the compressor stop signal is output in the first heating mode. Accordingly, a part of the refrigerant, remaining in the intermediate pressure refrigerant passage 15, flows out of the intermediate pressure refrigerant passage 15. As a result, a pressure of the refrigerant at the intermediate port 11d of the compressor 11 decreases. Therefore, the pressure difference between the pressure of the refrigerant at the intermediate port 11d of the compressor 11 and the pressure of the refrigerant at the suction port 11b of the compressor 11 while the compressor 11 is stopped is reduced. As a result, the backward rotation of the compressor 11 caused after the compressor 11 is stopped, e.g., an electrical supply to the electric motor 112 is stopped, can be suppressed. Thus, according to the present embodiment, the backward rotation of the compressor 11 can be suppressed without changing a hardware configuration drastically as compared to the conventional heat pump cycle 10.

A first comparative example with respect to the present embodiment will be described hereafter. According to the first comparative example is different from the present embodiment in that the compressor 11 is stopped without being operated in the single-stage compression mode when the compressor stop signal is output in the first heating mode. According to the first comparative example, the backward rotation of the compressor 11 is caused. In addition, the compressor 11 continues rotating backward for a long time. The compressor 11 cannot be restarted while rotating backward, thereby it is necessary to wait to restart the compressor 11 until the compressor 11 stops rotating backward. As a result, the compressor 11 cannot be restarted until the compressor 11 stops rotating backward even when the compressor stop signal is canceled. Thus, a temperature of the air to be blown into the vehicle compartment falls drastically and thereby comfortable feeling cannot be given to the passenger.

In contrast, according to the present embodiment, the backward rotation caused after stopping the compressor 11 can be suppressed, and thereby duration in which the compressor 11 continue rotating backward can be shortened or the compressor 11 does not rotate backward. That is, according to the present embodiment, time from stopping the compressor 11 to restarting the compressor 11 can be shortened as compared to the first comparative example in which the compressor 11 is stopped without being operated in the single-stage compression mode. Thus, according to the present embodiment, the compressor 11 can be restarted promptly when the compressor stop signal is canceled, and thereby a falling amount of the temperature of the air to be blown into the vehicle compartment can be small.

Figure 9:
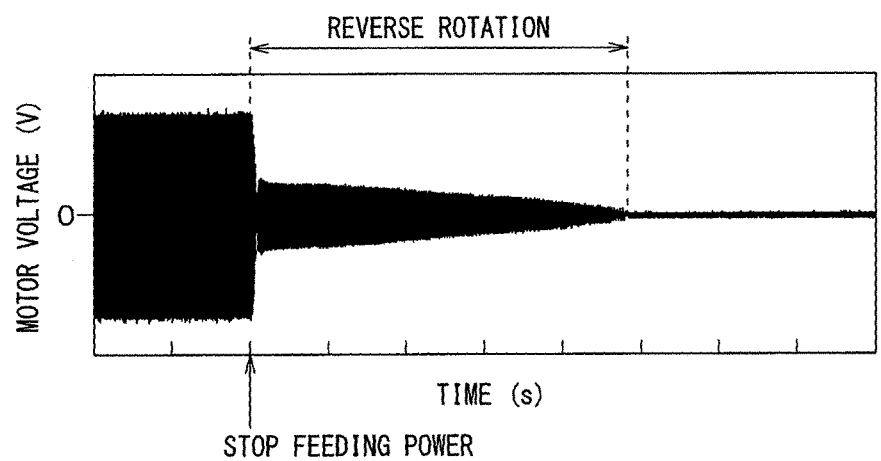
FIG. 9 is a diagram showing duration in which the compressor continues rotating backward according to a first comparative example.
Figure 10:
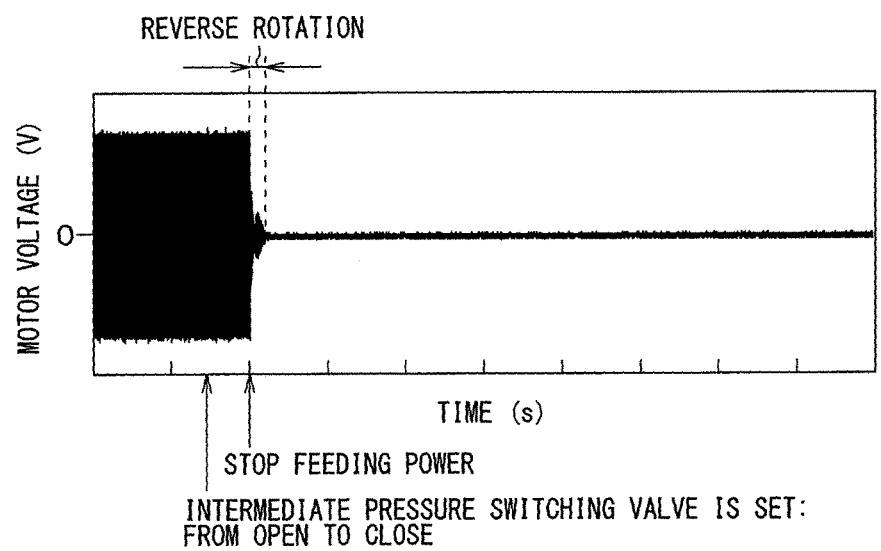
FIG. 10 is a diagram showing duration in which the compressor continues rotating backward according to the first embodiment.

FIG. 9 and FIG. 10 show the durations in which the compressor 11 continues rotating backward according to the first comparative example and the present embodiment respectively. According to the first comparative example, the compressor 11 is stopped without switching modes from the first heating mode to the single-stage compression mode. FIG. 9 and FIG. 10 show waveforms of the motor voltage. In FIG. 9 and FIG. 10, the vertical axis shows the motor voltage (i.e., UVW-phase voltage) and the horizontal axis shows time. The waveforms of the motor voltage caused after stopping the electrical supply to the electric motor 112 means the compressor 11 rotates backward. Amplitude of the waveforms of the motor voltage caused after stopping the electrical supply corresponds to a rotational speed of the compressor 11 rotating backward.

According to the first comparative example shown in FIG. 9, the duration from a time the compressor 11 starts rotating backward to a time the compressor 11 stops rotating backward is five seconds. In contrast, according to the present embodiment shown in FIG. 10, the duration is hundreds milliseconds under the same motor voltage as the first comparative example. Thus, according to the present embodiment, the duration from the time, where the compressor 11 is stopped, to a time, where the compressor 11 comes in a state of being capable of restarted, can be shortened as compared to the first comparative example.

For reference, duration, in which the compressor 11 is stopped, necessary to secure power for accelerating the vehicle is 0.5 second. In addition, the compressor 11 is preferably restarted within one second after being stopped such that a temperature decrease of the air to be blown into the vehicle compartment is suppressed enough to secure the comfortable feeling of the passenger. According to the present embodiment, the duration from the time, where the compressor 11 is stopped, to a time, where the compressor 11 comes in a state of being capable of restarted, can approach one second. As a result, the temperature decrease can be suppressed enough to secure the comfortable feeling of the passenger.

Here, according to the first comparative example, scroll teeth collide with each other and cause noise when the compressor 11 rotates backward after being stopped and when electric power is fed to the electric motor 112 to restart the compressor 11 while the compressor 11 rotates backward. Moreover, according to the first comparative example, power elements configuring the inverter 113 may be damaged when an unintended large current flows in the inverter 113 in conjunction with supplying power to the electric motor 112.

In contrast, according to the present embodiment, the backward rotation of the compressor 11 caused after stopping the compressor 11 can be suppressed and the compressor 11 is not restarted while rotating backward, thereby noise can be suppressed. In addition, according to the present embodiment, the damage of the power elements, which is caused when electric power is fed to the electric motor 112 while the compressor 11 rotates backward, can be suppressed.

Moreover, according to the present embodiment, the compressor 11 is operated for the specified time in the refrigerant circuit of the single-stage compression mode shown in FIG. 8. The specified time is set such that the pressure difference between the pressure of the refrigerant at the intermediate port 11*d* of the compressor 11 and the pressure of the refrigerant at the suction port 11*b* of the compressor 11 becomes smaller than or equal to the specified value. The specified time is set in a range, for example, from 200 milliseconds to 1 second.

Thus, according to the present embodiment, duration in which the compressor 11 is operated in the single-stage compression mode is short, and thereby the compressor 11 can be stopped promptly when the compressor stop signal is output from the host ECU 50. As a result, the power necessary to accelerate the vehicle can be secured promptly.

For reference, capacities of the refrigerant pipe 151 and the muffler 152 configuring the intermediate pressure refrigerant passage 15 are set to be capable of reducing the pulsation of the intermediate-pressure refrigerant sufficiently. In addition, the capacities are preferably set to be capable of making the intermediate-pressure refrigerant remaining in the intermediate pressure refrigerant passage 15 flow out of the intermediate pressure refrigerant passage 15 such that the backward rotation of the compressor 11 can be suppressed sufficiently. Then, the specified time can be shortened more effectively.

Second Embodiment

Figure 11:
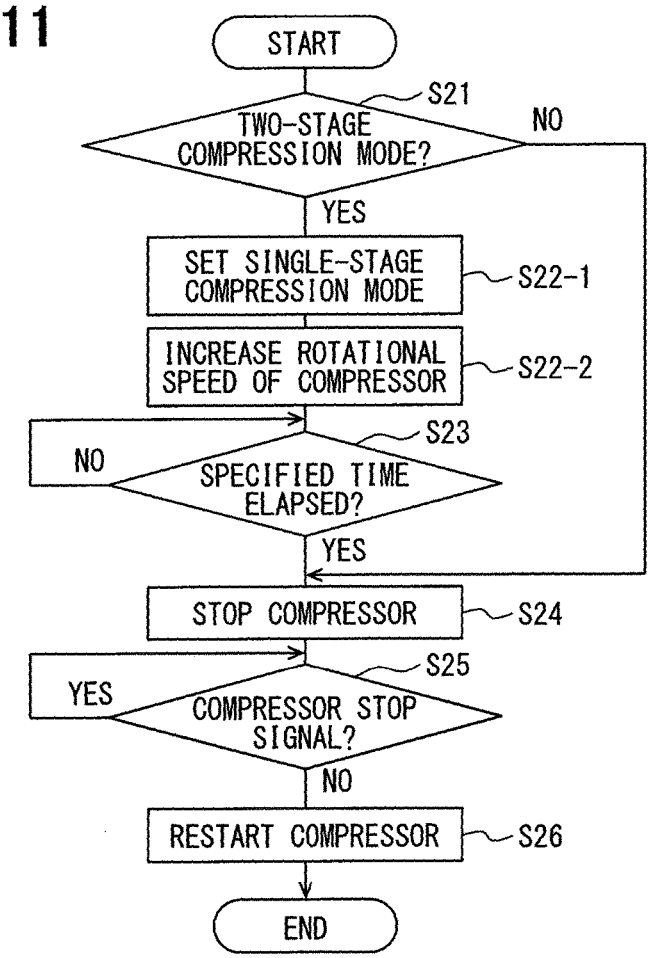
FIG. 11 is a flow chart showing a temporary stop operation operated by the air conditioning ECU according to a second embodiment.

The present embodiment is different from the first embodiment in that the temporary stop control that is performed at step S13 shown in FIG. 6 and stops the compressor 11 temporary. Specifically, according to the present embodiment, step S22-2 is added to the flow chart shown in FIG. 7 as shown in FIG. 11. In the flow chart shown in FIG. 11, step S22 of FIG. 7 is renumbered as step S22-1.

According to the present embodiment, the air conditioning ECU 40 switches from the refrigerant circuit of the first heating mode to the refrigerant circuit of the single-stage compression mode. Subsequently, the air conditioning ECU 40 increases a rotational speed of the compressor 11 to be higher than a rotational speed of the compressor 11 detected immediately before setting the refrigerant circuit of the single-stage compression mode.

That is, the air conditioning ECU 40, when operating the compressor 11 in the single-stage compression mode, increases the rotational speed of the compressor 11 to be higher than the rotational speed of the compressor 11 detected immediately before switching from the refrigerant circuit of the first heating mode to the refrigerant circuit of the single-stage compression mode. As a result, a volume of the refrigerant flowing out of the intermediate pressure refrigerant passage 15 per unit time increases as compared to a case where the rotational speed of the compressor 11 is not increased, and thereby the duration (i.e., the specified time) in which the compressor 11 is operated in the single-stage compression mode can be shortened.

According to the present embodiment, the compressor 11 is operated in the single-stage compression mode in a manner that the rotational speed is increased instantaneously before stopping the compressor 11, e.g., when a driver presses a gas pedal and the power for accelerating the vehicle is required to be secured.

Third Embodiment

According to the present embodiment, a stop control that stops the compressor 11 when the ignition switch is switched from being on to being off will be described hereafter.

Figure 12:
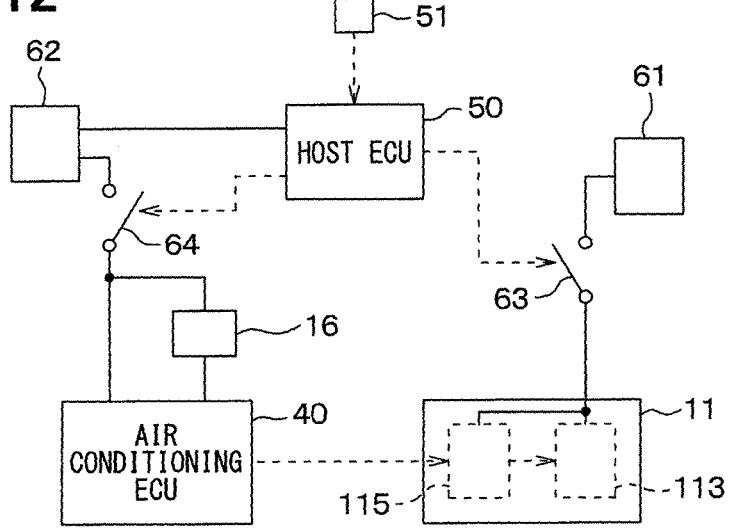
FIG. 12 is a block diagram illustrating a configuration of a power supply system according to a third embodiment.

First, a power supply system mounted to the vehicle will be described. As shown in FIG. 12, the vehicle has a high-voltage power supply 61 and a low-voltage power supply 62. The high-voltage power supply 61 is a main power source that supplies high voltage power of 200-300 V to the main mechanism such as the motor for moving the vehicle. The low-voltage power supply 62 is a secondary power source that supplies low voltage power of 12V to an auxiliary device mounted to the vehicle.

The high-voltage power supply 61 is connected to the compressor 11 and supplies power to the compressor 11. Specifically, the high-voltage power supply 61 supplies power the inverter 113 and a controller 115 of the compressor 11. The electrical supply from the high-voltage power supply 61 to the compressor 11 is started and stopped in a manner that the host ECU 50 switches a high-voltage power supply switch 63 between being on and being off. The high-voltage power supply switch 63 is located in a feeding path connecting the compressor 11 and the high-voltage power supply 61 to each other.

The controller 115 of the compressor 11 is an electronic control unit disposed to the compressor 11 and is configured by a well-known microcomputer including CPU, ROM and RAM and a peripheral circuit of the microcomputer. The controller 115 controls the inverter 113 by outputting a control signal, corresponding to the control signal from the air conditioning ECU 40, to the inverter 113.

The low-voltage power supply 62 is connected to the air conditioning ECU 40 and the intermediate pressure switching valve 16 and supplies power to the air conditioning ECU 40 and the intermediate pressure switching valve 16. A low-voltage power supply switch 64 is located in a feeding path connecting the low-voltage power supply 62 to the air conditioning ECU 40 and the intermediate pressure switching valve 16. The electrical supply from the high-voltage power supply 61 to the air conditioning ECU 40 and the intermediate pressure switching valve 16 is started and stopped in a manner that the host ECU 50 switches the low-voltage power supply switch 64 between being on and being off.

The intermediate pressure switching valve 16 is connected to the air conditioning ECU 40. The air conditioning ECU 40 switches the intermediate pressure switching valve 16 between being open and being closed by starting and stopping the electrical supply from the low-voltage power supply 62 to the intermediate pressure switching valve 16. According to the present embodiment, the intermediate pressure switching valve 16 is a normally-off valve that is closed when the electrical supply from the low-voltage power supply 62 to the intermediate pressure switching valve 16 is stopped.

An input side of the host ECU 50 is connected to an ignition switch (i.e., an IG switch 51), and an operation signal from the IG switch 51 is input to the host ECU 50. The IG switch 51 is a main switch of the vehicle. The IG switch 51 is turned on by a user for moving the vehicle, and is turned off by the user thereby stopping the electrical supply from the high-voltage power supply 61 and the low-voltage power supply 62 to the various devices.

An output side of the host ECU 50 is connected to the high-voltage power supply switch 63 and the low-voltage power supply switch 64. The host ECU 50 switches each of the high-voltage power supply switch 63 and the low-voltage power supply switch 64 between being on and being off based on the operation signal from the IG switch 51. The low-voltage power supply 62 is connected to the host ECU 50 and supplies power to the host ECU 50 constantly.

A stop control that stops the compressor 11 when the IG switch 51 is switched from being on to being off while the vehicle air conditioner 1 performs the first heating mode will be described hereafter referring to FIG. 13. According to the present embodiment, the air conditioning ECU 40, the host ECU 50, and the controller 115 of the compressor 11 correspond to the controller of the present disclosure. The air conditioning ECU 40, the host ECU 50, and the controller 115 will be referred to as a first controller, a second controller, and a third controller respectively.

Figure 13:
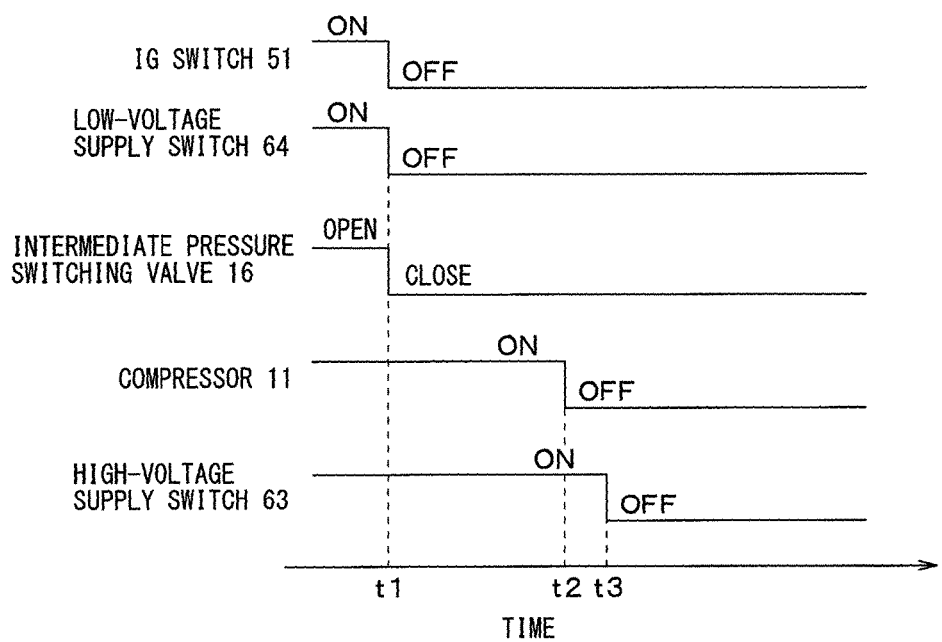
FIG. 13 is a timing chart showing timings where various devices are operated according to the third embodiment.

In the first heating mode, the IG switch 51 is turned off by the user at time t1 shown in FIG. 13. At this moment, the host ECU 50 turns off the low-voltage power supply switch 64 in advance of turning off the high-voltage power supply switch 63.

Accordingly, the electrical supply from the low-voltage power supply 62 to the air conditioning ECU 40 and the intermediate pressure switching valve 16 is stopped. Then the intermediate pressure switching valve 16 is switched from being open to being closed. As a result, as in the first embodiment, the refrigerant circuits are switched from the refrigerant circuit of the two-stage compression mode shown in FIG. 2 to the refrigerant circuit of the single-stage compression mode shown in FIG. 8. At this time, the compressor 11 continues operating since the high-voltage power supply switch 63 is on and the high-voltage power supply 61 continues supplying power to the compressor 11.

The host ECU 50 communicates with the air conditioning ECU 40 to read information regarding which operation mode the vehicle air conditioner 1 is performing. When the IG switch 51 is switched from being on to being off, the host ECU 50 determines whether the operation mode is the first heating mode. When the host ECU 50 determines the operation mode is the first heating mode, the host ECU 50 switches the low-voltage power supply switch 64 from being on to being off in advance of switching the high-voltage power supply switch 63. On the other hand, when the host ECU 50 determines the operation mode is not the first heating mode, the host ECU 50 turns off both the high-voltage power supply switch 63 and the low-voltage power supply switch 64 simultaneously. However, the operation of the host ECU 50 is not limited. For example, the host ECU 50 may switch the low-voltage power supply switch 64 from being on to being off in advance of switching the high-voltage power supply switch 63 when the IG switch 51 is switched from being on to being off, regardless which operation mode is performed and whether the compressor 11 is stopped.

Here, the controller 115 of the compressor 11 performs a protect control that stops the compressor 11 when a failure to communicate with the air conditioning ECU 40 is detected while the compressor 11 is operated. The protect control is performed constantly while the electrical supply to the controller 115 is continued.

Figure 14:
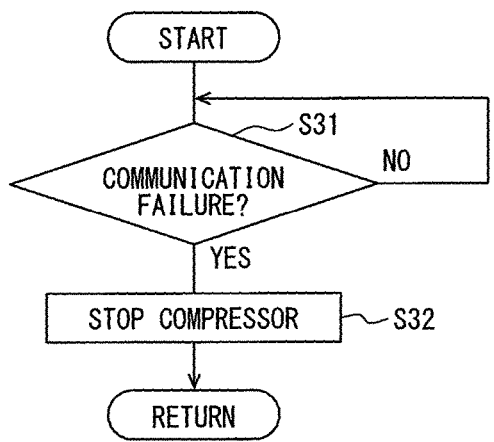
FIG. 14 is a flow chart showing a protect control operated by a control section of the compressor according to the third embodiment.

That is, as shown in FIG. 14, the controller 115 determines whether the communication failure is caused or not at step S31. Specifically, the controller 115 determines the communication failure is caused (S32: YES) when the control signal from the air conditioning ECU 40 is not input to the controller 115. When the controller 115 determines the communication failure is caused, the control flow advances to step S32. On the other hand, when the control signal from the air conditioning ECU 40 is input to the controller 115, the controller 115 performs processing of step S31 again. The processing of step S31 is performed repeatedly until the controller 115 determines the communication failure is caused.

At step S32, the controller 115 stops outputting the control signal to the inverter 113 to stop the compressor 11. According to the present embodiment, starting timings to start processing of step S31 and step S32 are set such that duration from turning off the IG switch 51 to stopping the compressor 11 becomes a specified time. The specified time is set to a time that can suppress the backward rotation of the compressor 11. That is, the specified time is set such that the pressure difference between the pressure of the refrigerant at the intermediate port 11d of the compressor 11 and the pressure of the refrigerant at the suction port 11b of the compressor 11 becomes lower than or equal to the specified value and that uncomfortable feeling is not given to the passenger when the compressor 11 continues operating after switching the IG switch 51 from being on to being off. The specified time is set, for example, in a range from 200 milliseconds to 1 second.

Accordingly, the compressor 11 is stopped at time t2 shown in FIG. 13 when the controller 115 detects the communication failure after the IG switch 51 is turned off. That is, the compressor 11 continues operating in the single-stage compression mode until the controller 115 detects the communication failure after the IG switch 51 is turned off.

After the compressor 11 is stopped, the host ECU 50 switches the high-voltage power supply switch 63 from being on to being off at time t3 shown in FIG. 13. The high-voltage power supply switch 63 stops supplying power to the compressor 11 then.

A second comparative example with respect to the present embodiment will be described hereafter. The second comparative example is different from the present embodiment in that the compressor 11 is stopped in a manner that the high-voltage power supply switch 63 and the low-voltage power supply switch 64 are turned off simultaneously immediately after the IG switch 51 is turned off in the first heating mode so as to stop supplying power to the air conditioning ECU 40 and the compressor 11. According to the second comparative example, the scroll teeth collide with each other and cause noise when the compressor 11 rotates backward after being stopped. The noise is issue since the various devices are stopped and the vehicle compartment is quiet when the IG switch 51 is off and thereby the passenger can hear the noise easily.

Here, according to the present embodiment, the host ECU 50 maintains the electrical supply from the high-voltage power supply 61 to the compressor 11 and stops the electric supply from the low-voltage power supply 62 to the air conditioning ECU 40 and the intermediate pressure switching valve 16, when the IG switch 51 is turned off in the first heating mode. At this time, the intermediate pressure switching valve 16 is switched from being open to being closed since the intermediate pressure switching valve 16 is configured to be closed while the electrical supply to the intermediate pressure switching valve 16 is stopped. In addition, the high-voltage power supply 61 continues supplying power to the compressor 11, and thereby the compressor 11 continues operating, even when the low-voltage power supply 62 stops supplying power to the air conditioning ECU 40 and the air conditioning ECU 40 stops operating. The compressor 11 is stopped when the controller 115 of the compressor 11 detects the communication failure to communicate with the air conditioning ECU 40. Thus, according to the present embodiment, the compressor 11 is stopped when specified conditions are met. After the compressor 11 is stopped, the host ECU 50 stops the electric supply from the high-voltage power supply 61 to the compressor 11.

Thus, according to the present embodiment, the refrigerant circuit of the single-stage compression mode is set when the IG switch 51 is turned off in the first heating mode. The compressor 11 continues operating in the single-stage compression mode for the specified time and then stops operating. As a result, according to the present embodiment, the backward rotation of the compressor 11 caused after stopping the compressor 11 can be suppressed as in the first embodiment, and thereby the noise can be suppressed, since the compressor 11 is operated in the single-stage compression mode before being stopped.

As described above, the compressor 11 is stopped when the controller 115 of the compressor 11 detects the communication failure to communicate with the air conditioning ECU 40 according to the present embodiment. However, the stop control to stop the compressor 11 may be modified.

For example, the controller 115 of the compressor 11 may be connected to the low-voltage power supply 62 through the low-voltage power supply switch 64 so as to monitor (i.e., detect) a voltage between the low-voltage power source 62 and the various devices connected to the low-voltage power supply 62. The controller 115 of the compressor 11 may stop the compressor 11 when determining the monitored voltage (i.e., the detected voltage) to be zero. That is, the controller 115 of the compressor 11 may stop the compressor 11 when determining a specified condition is met. In this case, starting timings to start determining whether the monitored voltage is zero and to start outputting the compressor stop signal that requests to stop the compressor 11 are set such that the duration from turning off the low-voltage power supply switch 64 to stopping the compressor 11 becomes the specified time.

Alternatively, the host ECU 50 may stop the low-voltage power supply 62 from supplying power when the IG switch 51 is switched from being on to being off. Subsequently, the host ECU 50 stops the high-voltage power supply 61 from supplying power to the compressor 11 when the specified time elapses from stopping the electric supply from the low-voltage power supply 62. According to this example, the compressor 11 can be stopped without performing the stop control operated by the controller 115 to stop the compressor 11. That is, the compressor 11 may continue operating as long as the high-voltage power supply 61 continues supplying power to the compressor 11.

Modifications

The present disclosure is not limited to the above-described embodiments and can be modified within the scope of the present disclosure as defined by the appended claims. It should be understood that the present disclosure includes modifications based on the above-described embodiments and other modifications within the scope of the above-described embodiments.

(1) According to the first embodiment, the refrigerant circuit of the single-stage compression mode shown in FIG. 8 makes the refrigerant to flow as the same as the refrigerant circuit of the first heating mode, although being different from the refrigerant circuit of the first heating mode in that the flow of the intermediate-pressure refrigerant into the intermediate pressure refrigerant passage 15 is blocked. However, the refrigerant circuit of the single-stage compression mode may be a different circuit. The refrigerant circuit of the single-stage compression mode circulates the refrigerant discharged from the compressor 11. The refrigerant circuit of the single-stage compression mode can be modified such that at least the flow of the intermediate-pressure refrigerant into the intermediate pressure refrigerant passage 15 is blocked and that the intermediate-pressure refrigerant remaining in the intermediate pressure refrigerant passage 15 can flow out of the intermediate pressure refrigerant passage 15. For example, the refrigerant circuit of the second heating mode may be used as the refrigerant circuit of the single-stage compression mode. In this case, the first pressure reducer 13, the intermediate pressure switching valve 16, and the switching valve 173 of the second pressure reducer 17 configure a switching device that switches between the refrigerant circuit of the two-stage compression mode and the refrigerant circuit of the single-stage compression mode. In other words, the first pressure reducer 13, the intermediate pressure switching valve 16, and the switching valve 173 of the second pressure reducer 17 are a cycle configuring members that switch between the refrigerant circuit of the two-stage compression mode and the refrigerant circuit of the single-stage compression mode.

(2) According to the first embodiment, the air conditioning ECU 40 performs the temporary stop control at step S13 shown in FIG. 6 to stop the compressor 11 temporary when the compressor 11 is required to be stopped temporary in the first heating mode. However, the host ECU 50 may perform the temporary stop control to stop the compressor 11 temporary.

Specifically, the host ECU 50 may control the inverter 113 and the intermediate pressure switching valve 16 directly without interposing the air conditioning ECU 40. A control performed by the host ECU 50 takes priority of a control performed by the air conditioning ECU 40 in a case where both the host ECU 50 and the air conditioning ECU 40 control the inverter 113 and the intermediate pressure switching valve 16. In this case, the host ECU 50 switches the intermediate pressure switching valve 16 from being open to being closed when the compressor 11 is required to be stopped to secure power for accelerating the vehicle while the air conditioning ECU 40 operates the vehicle air conditioner 1 in the first heating mode. When the compressor 11 operates for the specified time after the intermediate pressure switching valve 16 is closed, the host ECU 50 outputs the compressor stop signal to the inverter 113 and stops the compressor 11. Subsequently, the host ECU 50 stops outputting the compressor stop signal to the inverter 113 when the compressor 11 is not requested to be stopped, thereby the compressor 11 is restarted. The air conditioning ECU 40 performs the normal control after the compressor 11 is restarted. Thus, the temporary stop control that stops the compressor 11 temporary is performed as described above. In this case, the air conditioning ECU 40, the host ECU 50, and the inverter 113 coincide with the controller of the present disclosure.

(3) The temporary stop control that stops the compressor 11 temporary is performed when it is required to secure power for accelerating the vehicle according to the above-described embodiments, however may be performed another situation. For example, the temporary stop control may be performed when it is required to secure power for an electric supply from the high-voltage power supply 61 to the various devices mounted to the vehicle.

(4) According to the above-described embodiments, the intermediate pressure switching valve 16 switches between the refrigerant circuit in which the intermediate-pressure refrigerant flows into the intermediate pressure refrigerant passage 15 and the refrigerant circuit in which the flow of the intermediate-pressure refrigerant into the intermediate pressure refrigerant passage 15 is blocked. However, an integrated valve that integrates a function of the intermediate pressure switching valve 16 and functions of other devices configuring the heat pump cycle 10 may be disposed. The integrated valve switches between the refrigerant circuit in which the intermediate-pressure refrigerant flows into the intermediate pressure refrigerant passage 15 and the refrigerant circuit in which the flow of the intermediate-pressure refrigerant into the intermediate pressure refrigerant passage 15 is blocked. In this case, the integrated valve configures the switching device that switches between the refrigerant circuit of the two-stage compression mode and the refrigerant circuit of the single-stage compression mode. For example, the integrated valve may integrate a function of the intermediate pressure switching valve 16, a function of the gas-liquid separator 14, a function of the fixed throttle 171, and a function of the switching valve 173 of the first bypass passage 172.

(5) The vehicle air conditioner 1 performs the first heating mode and the second heating mode as the heating mode according to the above-described embodiments, however may perform only the first heating mode. Alternatively, the vehicle air conditioner 1 may perform only the heating mode of the heating mode and the cooling mode.

(6) The vehicle air conditioner 1 of the present disclosure is used in the hybrid vehicle according to the above-described embodiments however may be used in another vehicle such as an electric vehicle and a fuel cell vehicle as long as the vehicle uses electric compressor.

(7) The second pressure reducer 17 is configured by the fixed throttle 171, the first bypass passage 172 and the switching valve 173 according to the above-described embodiments however may be configured by an electric variable throttle mechanism similar to the first pressure reducer 13.

(8) The above-described embodiments are not unrelated to each other and can be combined with each other except for a case where the combination is clearly improper. For example, the second embodiment may be combined with the third embodiment. That is, the third embodiment may be modified such that the rotational speed of the compressor 11 may be increased when the compressor 11 is operated in the single-stage compression mode as compared to the rotational speed of the compressor 11 immediately before switching from the refrigerant circuit of the two-stage compression mode to the refrigerant circuit of the single-stage compression mode. The rotational speed is increased, e.g., in a manner that the host ECU 50 outputs a control signal to the inverter 113 when the IG switch 51 is switched from being on to being off in the first heating mode.

In the above-described embodiments, it is to be understood that elements constituting the embodiments are not necessary except for a case of being explicitly specified to be necessary and a case of being considered to be absolutely necessary in principle.

What is claimed is:
1. An air conditioner for a vehicle that supplies air into a vehicle compartment, the air conditioner comprising:
   a compressor that has
      a suction port that draws a low-pressure refrigerant,
      a compression mechanism that compresses the low-pressure refrigerant to be a high-pressure refrigerant,
      a discharge port that discharges the high-pressure refrigerant,
      an intermediate port that draws an intermediate-pressure refrigerant from a cycle and guides the intermediate-pressure refrigerant to flow into the compression mechanism and join a refrigerant being compressed in the compression mechanism, and
      an electric motor that operates the compression mechanism;
   a radiator that performs a heat exchange between the air and the high-pressure refrigerant discharged by the discharge port and makes the high-pressure refrigerant to radiate heat;
   a first pressure reducer that reduces a pressure of refrigerant flowing out of the radiator to be the intermediate-pressure refrigerant;
   a gas-liquid separator that separates the intermediate-pressure refrigerant, which flows from the first pressure reducer, into a gas-phase refrigerant and a liquid-phase refrigerant;
   a second pressure reducer that reduces a pressure of the liquid-phase refrigerant separated in the gas-liquid separator to be the low-pressure refrigerant;
   an exterior heat exchanger that performs a heat exchange between an outside air from an outside of the vehicle compartment and the refrigerant flowing out of the second pressure reducer and evaporates the refrigerant;
   an intermediate-pressure refrigerant passage that guides the gas-phase refrigerant separated in the gas-liquid separator to flow to the intermediate port;
   a switching device that switches between
      a refrigerant circuit of a two-stage compression mode that guides the intermediate-pressure refrigerant to the intermediate port and
      a refrigerant circuit of a single-stage compression mode that blocks at least a flow of the intermediate-pressure refrigerant into the intermediate-pressure refrigerant passage and guides the refrigerant remaining in the intermediate-pressure refrigerant passage to flow out of the intermediate-pressure refrigerant passage; and
   a controller that controls the compressor and the switching device, wherein
   the controller, when receiving a compressor stop signal that requests to stop the compressor in the two-stage compression mode,
      operates the switching device to switch from the refrigerant circuit of the two-stage compression mode to the refrigerant circuit of the single-stage compression mode,
      operates the compressor in the single-stage compression mode for a specified time and then stops the compressor, and
      restarts the compressor when the compressor stop signal is canceled, and
   the controller increases a rotational speed of the compressor when operating the compressor in the single-stage compression mode, as compared to a rotational speed of the compressor immediately before switching from the refrigerant circuit of the two-stage compression mode to the refrigerant circuit of the single-stage compression mode.

2. The air conditioner for a vehicle according to claim 1, further comprising:

a main power source for the vehicle that supplies power to the compressor; and a secondary power source for the vehicle that supplies power to the switching device, wherein the switching device switches from the refrigerant circuit of the two-stage compression mode to the refrigerant circuit of the single-stage compression mode when the secondary power source stops supplying power to the switching device, the controller, when the main power source and the secondary power source are switched to stop supplying power by a user in the two-stage compression mode, operates the secondary power source to stop supplying power to the switching device, operates the compressor to continue operating for a specified time in the single-stage compression mode, and operates the main power source to stop supplying power to the compressor.

3. The air conditioner for a vehicle according to claim 2, wherein the controller has
a first controller that controls the compressor and the switching device,
a second controller that controls a main mechanism of the vehicle, and
a third controller that is disposed to the compressor and controls the compressor, the main power source supplies power to the third controller, the secondary power source supplies power to the first controller, the second controller
controls the main power source to start and stop supplying power to the third controller and the compressor and
controls the secondary power source to start and stop supplying power to the first controller and the switching device, the second controller controls the secondary power source to stop supplying power to the first controller and the switching device and then controls the main power source to stop supplying power to the third controller and the compressor, and the third controller stops the compressor when a specified condition is met before the second controller controls the main power source to stop supplying power to the third controller and the compressor.

4. The air conditioner for a vehicle according to claim 2, wherein the controller has
a first controller that controls the compressor and the switching device and
a second controller that controls a main mechanism of the vehicle, the secondary power source supplies power to the first controller, the second controller
operates the main power source to start and stop supplying power to the compressor and
operates the secondary power source to start and stop supplying power to the first controller and the switching device, and the second controller controls the main power source to stop supplying power to the compressor and thereby stopping the compressor when the specified time elapses after the secondary power source stops supplying power to the first controller and the switching device.

5. The air conditioner for a vehicle according to claim 1, wherein the specified time is set such that a pressure difference between a pressure of the refrigerant at the intermediate port and a pressure of the refrigerant at the suction port becomes smaller than or equal to a specified value.

6. The air conditioner for a vehicle according to claim 1, wherein the specified time is set within a range of 200 milliseconds to 1 second.

7. An air conditioner for a vehicle that supplies air into a vehicle compartment, the air conditioner comprising:

a compressor that has
a suction port that draws a low-pressure refrigerant,
a discharge port that discharges a high-pressure refrigerant,
an intermediate port that draws an intermediate-pressure refrigerant from a cycle and guides the intermediate-pressure refrigerant to flow and join a refrigerant being compressed, and
an electric motor;

a radiator that performs a heat exchange between the air and the high-pressure refrigerant discharged by the discharge port and makes the high-pressure refrigerant to radiate heat;

a first pressure reducer that reduces a pressure of refrigerant flowing out of the radiator to be the intermediate-pressure refrigerant;

a gas-liquid separator that separates the intermediate-pressure refrigerant, which flows from the first pressure reducer, into a gas-phase refrigerant and a liquid-phase refrigerant;

a second pressure reducer that reduces a pressure of the liquid-phase refrigerant separated in the gas-liquid separator to be the low-pressure refrigerant;

an exterior heat exchanger that performs a heat exchange between an outside air from an outside of the vehicle compartment and the refrigerant flowing out of the second pressure reducer and evaporates the refrigerant;

an intermediate-pressure refrigerant passage that guides the gas-phase refrigerant separated in the gas-liquid separator to flow to the intermediate port;

a switching valve configured to switch between
a refrigerant circuit of a two-stage compression mode that guides the intermediate-pressure refrigerant to the intermediate port and
a refrigerant circuit of a single-stage compression mode that blocks at least a flow of the intermediate-pressure refrigerant into the intermediate-pressure refrigerant passage and guides the refrigerant remaining in the intermediate-pressure refrigerant passage to flow out of the intermediate-pressure refrigerant passage; and a controller that controls the compressor and the switching valve, wherein the controller, when receiving a compressor stop signal that requests to stop the compressor in the two-stage compression mode,
operates the switching valve to switch from the refrigerant circuit of the two-stage compression mode to the refrigerant circuit of the single-stage compression mode, operates the compressor in the single-stage compression mode for a specified time and then stops the compressor, and
restarts the compressor when the compressor stop signal is canceled, and
the controller increases a rotational speed of the compressor when operating the compressor in the single-stage compression mode, as compared to a rotational speed of the compressor immediately before switching from the refrigerant circuit of the two-stage compression mode to the refrigerant circuit of the single-stage compression mode.

8. The air conditioner for a vehicle according to claim 7, further comprising:
a main power source for the vehicle that supplies power to the compressor; and
a secondary power source for the vehicle that supplies power to the switching valve, wherein
the switching valve switches from the refrigerant circuit of the two-stage compression mode to the refrigerant circuit of the single-stage compression mode when the secondary power source stops supplying power to the switching valve,
the controller, when the main power source and the secondary power source are switched to stop supplying power by a user in the two-stage compression mode,
operates the secondary power source to stop supplying power to the switching valve,
operates the compressor to continue operating for a specified time in the single-stage compression mode, and
operates the main power source to stop supplying power to the compressor.

9. An air conditioner for a vehicle that supplies air into a vehicle compartment, the air conditioner comprising:
a compressor that has
a suction port that draws a low-pressure refrigerant,
a compression mechanism that compresses the low-pressure refrigerant to be a high-pressure refrigerant,
a discharge port that discharges the high-pressure refrigerant,
an intermediate port that draws an intermediate-pressure refrigerant from a cycle and guides the intermediate-pressure refrigerant to flow into the compression mechanism and join a refrigerant being compressed in the compression mechanism, and
an electric motor that operates the compression mechanism;
a radiator that performs a heat exchange between the air and the high-pressure refrigerant discharged by the discharge port and makes the high-pressure refrigerant to radiate heat;
a first pressure reducer that reduces a pressure of refrigerant flowing out of the radiator to be the intermediate-pressure refrigerant;
a gas-liquid separator that separates the intermediate-pressure refrigerant, which flows from the first pressure reducer, into a gas-phase refrigerant and a liquid-phase refrigerant;
a second pressure reducer that reduces a pressure of the liquid-phase refrigerant separated in the gas-liquid separator to be the low-pressure refrigerant;
an exterior heat exchanger that performs a heat exchange between an outside air from an outside of the vehicle compartment and the refrigerant flowing out of the second pressure reducer and evaporates the refrigerant;
an intermediate-pressure refrigerant passage that guides the gas-phase refrigerant separated in the gas-liquid separator to flow to the intermediate port;
a switching device that switches between
a refrigerant circuit of a two-stage compression mode that guides the intermediate-pressure refrigerant to the intermediate port and
a refrigerant circuit of a single-stage compression mode that blocks at least a flow of the intermediate-pressure refrigerant into the intermediate-pressure refrigerant passage and guides the refrigerant remaining in the intermediate-pressure refrigerant passage to flow out of the intermediate-pressure refrigerant passage;
a controller that controls the compressor and the switching device;
a main power source for the vehicle that supplies power to the compressor; and
a secondary power source for the vehicle that supplies power to the switching device, wherein
the controller, when receiving a compressor stop signal that requests to stop the compressor in the two-stage compression mode,
operates the switching device to switch from the refrigerant circuit of the two-stage compression mode to the refrigerant circuit of the single-stage compression mode,
operates the compressor in the single-stage compression mode for a specified time and then stops the compressor, and
restarts the compressor when the compressor stop signal is canceled,
the switching device switches from the refrigerant circuit of the two-stage compression mode to the refrigerant circuit of the single-stage compression mode when the secondary power source stops supplying power to the switching device, and
the controller, when the main power source and the secondary power source are switched to stop supplying power by a user in the two-stage compression mode,
operates the secondary power source to stop supplying power to the switching device,
operates the compressor to continue operating for a specified time in the single-stage compression mode, and
operates the main power source to stop supplying power to the compressor.

10. The air conditioner for a vehicle according to claim 9, wherein
the controller has
a first controller that controls the compressor and the switching device,
a second controller that controls a main mechanism of the vehicle, and
a third controller that is disposed to the compressor and controls the compressor,
the main power source supplies power to the third controller,
the secondary power source supplies power to the first controller,
the second controller
controls the main power source to start and stop supplying power to the third controller and the compressor and
controls the secondary power source to start and stop supplying power to the first controller and the switching device, the second controller controls the secondary power source to stop supplying power to the first controller and the switching device and then controls the main power source to stop supplying power to the third controller and the compressor, and the third controller stops the compressor when a specified condition is met before the second controller controls the main power source to stop supplying power to the third controller and the compressor.

11. The air conditioner for a vehicle according to claim 9, wherein the controller has a first controller that controls the compressor and the switching device and a second controller that controls a main mechanism of the vehicle, the secondary power source supplies power to the first controller, the second controller operates the main power source to start and stop supplying power to the compressor and operates the secondary power source to start and stop supplying power to the first controller and the switching device, and the second controller controls the main power source to stop supplying power to the compressor and thereby stopping the compressor when the specified time elapses after the secondary power source stops supplying power to the first controller and the switching device.

12. The air conditioner for a vehicle according to claim 9, wherein the specified time is set such that a pressure difference between a pressure of the refrigerant at the intermediate port and a pressure of the refrigerant at the suction port becomes smaller than or equal to a specified value.

13. The air conditioner for a vehicle according to claim 9, wherein the specified time is set within a range of 200 milliseconds to 1 second.

* * * * *